US011462099B2

United States Patent
Wissing et al.

(10) Patent No.: US 11,462,099 B2
(45) Date of Patent: Oct. 4, 2022

(54) CONTROL SYSTEM AND CONTROL METHOD FOR INTERACTION-BASED LONG-TERM DETERMINATION OF TRAJECTORIES FOR MOTOR VEHICLES

(71) Applicant: ZF Automotive Germany GmbH, Alfdorf (DE)

(72) Inventors: Christian Wissing, Wesel (DE); Manuel Schmidt, Dortmund (DE); Andreas Homann, Dortmund (DE); Christian Lienke, Dortmund (DE); Torsten Bertram, Düsseldorf (DE); Anne Stockem Novo, Gladbeck (DE); Martin Krüger, Lossatal (DE); Till Nattermann, Krefeld (DE); Karl-Heinz Glander, Monheim (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 420 days.

(21) Appl. No.: 16/783,281

(22) Filed: Feb. 6, 2020

(65) Prior Publication Data
US 2020/0258380 A1 Aug. 13, 2020

(30) Foreign Application Priority Data
Feb. 8, 2019 (DE) .......................... 102019103106.0

(51) Int. Cl.
*G08G 1/01* (2006.01)
*G08G 1/052* (2006.01)
(Continued)

(52) U.S. Cl.
CPC ........... *G08G 1/0125* (2013.01); *G06F 30/20* (2020.01); *G08G 1/04* (2013.01); *G08G 1/052* (2013.01);
(Continued)

(58) Field of Classification Search
CPC ........ G08G 1/0125; G08G 1/04; G08G 1/052; G08G 1/165; B60W 30/09; B60W 30/08
See application file for complete search history.

(56) References Cited

U.S. PATENT DOCUMENTS 10,246,088 B2 * 4/2019 Keller ..................... G08G 1/167
10,345,814 B2 * 7/2019 Keller ....................... B60T 7/22
(Continued)

FOREIGN PATENT DOCUMENTS

DE 102014211507 12/2015
WO 2018197083 11/2018

*Primary Examiner* — Hoi C Lau
(74) *Attorney, Agent, or Firm* — Tarolli, Sundheim, Covell & Tummino LLP

(57) ABSTRACT

A control system for use in a motor vehicle is used for monitoring a current driving situation of the motor vehicle, based on surroundings data of the host motor vehicle in the current driving situation, obtained from at least one surroundings sensor situated on the host motor vehicle. The control system is used to recognize lanes, lane boundary lines, lane markings, and/or other motor vehicles in an area in front of, to the side of, and/or behind the host motor vehicle. In addition, the control system is used to determine at least one driving parameter for each other motor vehicle present in the surroundings of the host motor vehicle, based on the provided surroundings data, and to generate a plurality of possible trajectories for the future travel course for each of the other motor vehicles, based on the driving parameter determined in each case. Lastly, the control system is used to carry out a simulation of the plurality of possible trajectories for the future travel course for each of the other motor vehicles, and to group in each case the plurality of possible trajectories for the future travel course for each of the other motor vehicles, based on the simulation.

10 Claims, 11 Drawing Sheets

(51) Int. Cl.
    *G08G 1/16*     (2006.01)
    *G08G 1/04*     (2006.01)
    *G06F 30/20*    (2020.01)
    *G06F 111/08*   (2020.01)

(52) U.S. Cl.
    CPC .......... *G08G 1/165* (2013.01); *G06F 2111/08* (2020.01)

(56) References Cited

U.S. PATENT DOCUMENTS

| | | | | |
|---|---|---|---|---|
| 10,725,470 B2* | 7/2020 | Mahabadi | ............ | G05D 1/0088 |
| 2008/0065328 A1* | 3/2008 | Eidehall | ................. | G01S 7/295 |
| | | | | 701/301 |
| 2011/0246156 A1* | 10/2011 | Zecha | ................. | G06V 40/23 |
| | | | | 703/6 |
| 2013/0054106 A1* | 2/2013 | Schmudderich | ....... | G06V 20/58 |
| | | | | 701/1 |
| 2015/0160653 A1* | 6/2015 | Cheatham, III | .. | B60W 30/0956 |
| | | | | 701/23 |
| 2015/0294571 A1* | 10/2015 | Shida | ..................... | G08G 1/167 |
| | | | | 701/409 |
| 2018/0043886 A1* | 2/2018 | Keller | ................... | B60W 40/04 |
| 2018/0043890 A1* | 2/2018 | Keller | ............... | B60W 30/0956 |
| 2018/0046191 A1* | 2/2018 | Keller | ................... | B60W 30/10 |
| 2018/0046192 A1* | 2/2018 | Keller | ............... | B60W 30/0953 |
| 2019/0047555 A1* | 2/2019 | During | ................. | B60W 30/09 |
| 2019/0072973 A1* | 3/2019 | Sun | ................... | B62D 15/0265 |
| 2019/0369637 A1* | 12/2019 | Shalev-Shwartz | ......................... | |
| | | | | G01C 21/3492 |
| 2020/0023835 A1* | 1/2020 | Harda | ................... | B60Q 9/008 |
| 2020/0258380 A1* | 8/2020 | Wissing | ............... | G08G 1/0125 |
| 2020/0298891 A1* | 9/2020 | Liang | ..................... | G06N 20/00 |
| 2021/0373566 A1* | 12/2021 | Agarwal | ............... | G05D 1/0223 |
| 2021/0397194 A1* | 12/2021 | Aubert | ............... | G01C 21/3446 |
| 2022/0082403 A1* | 3/2022 | Shapira | ................ | G06V 20/647 |

\* cited by examiner

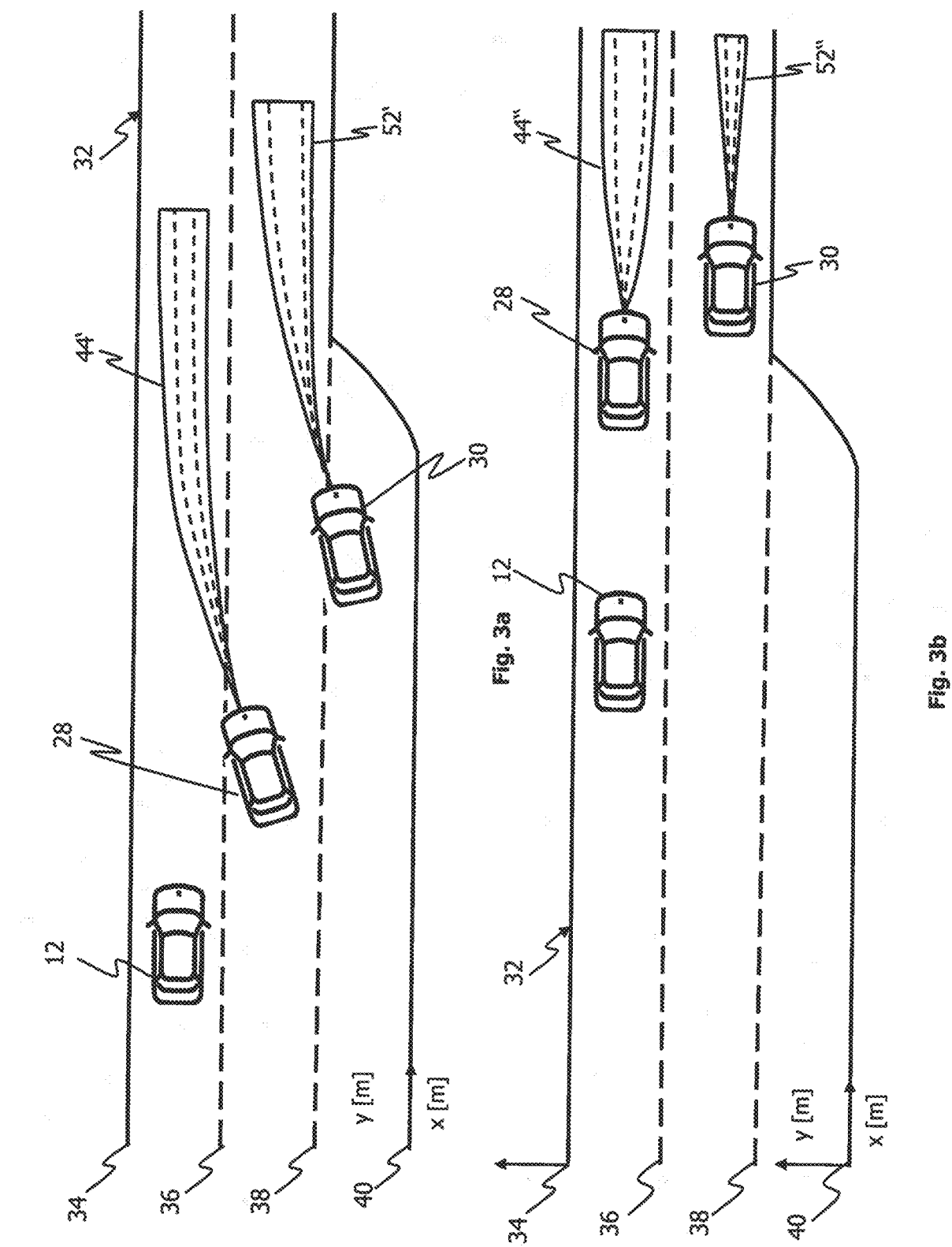

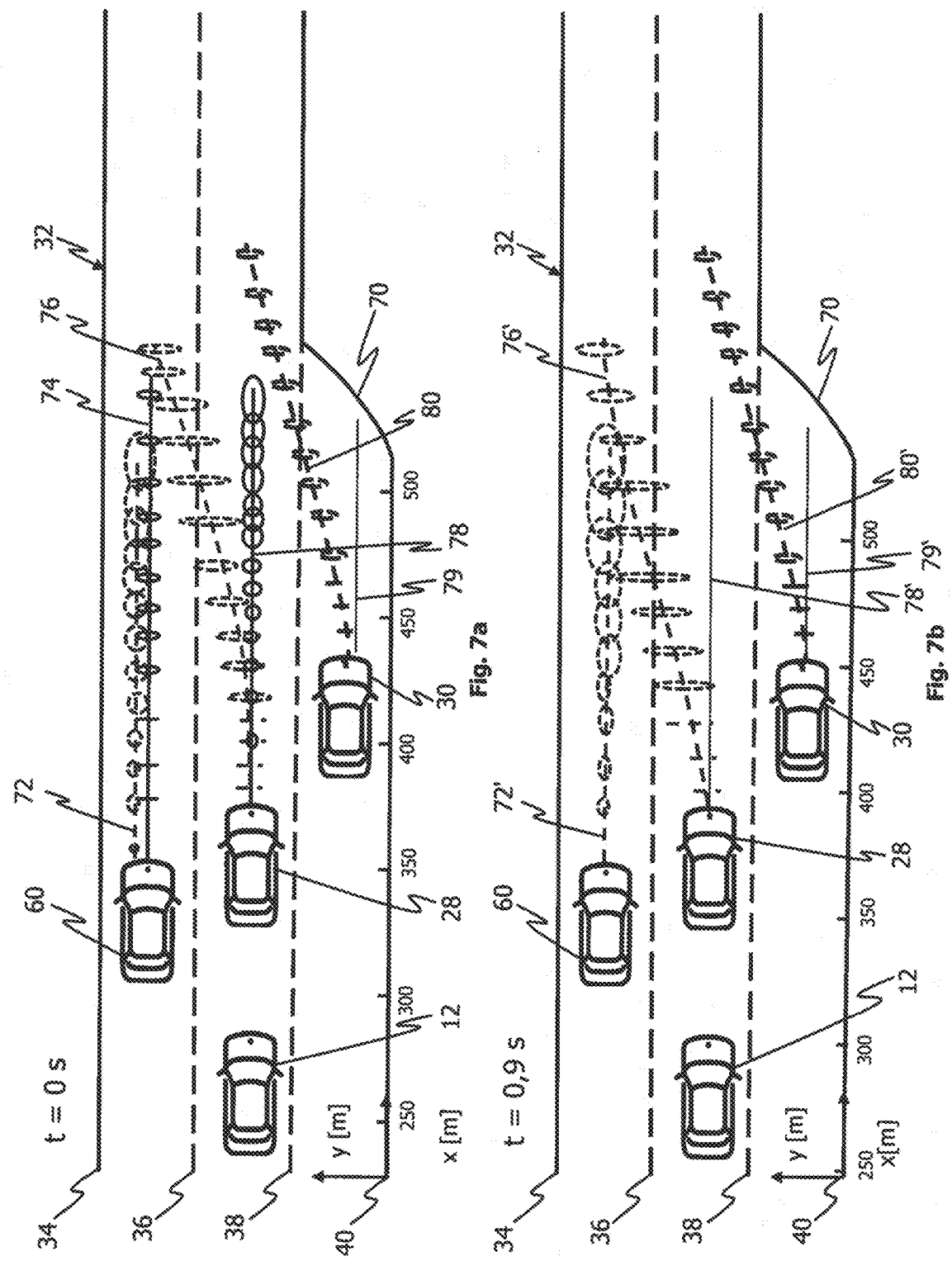

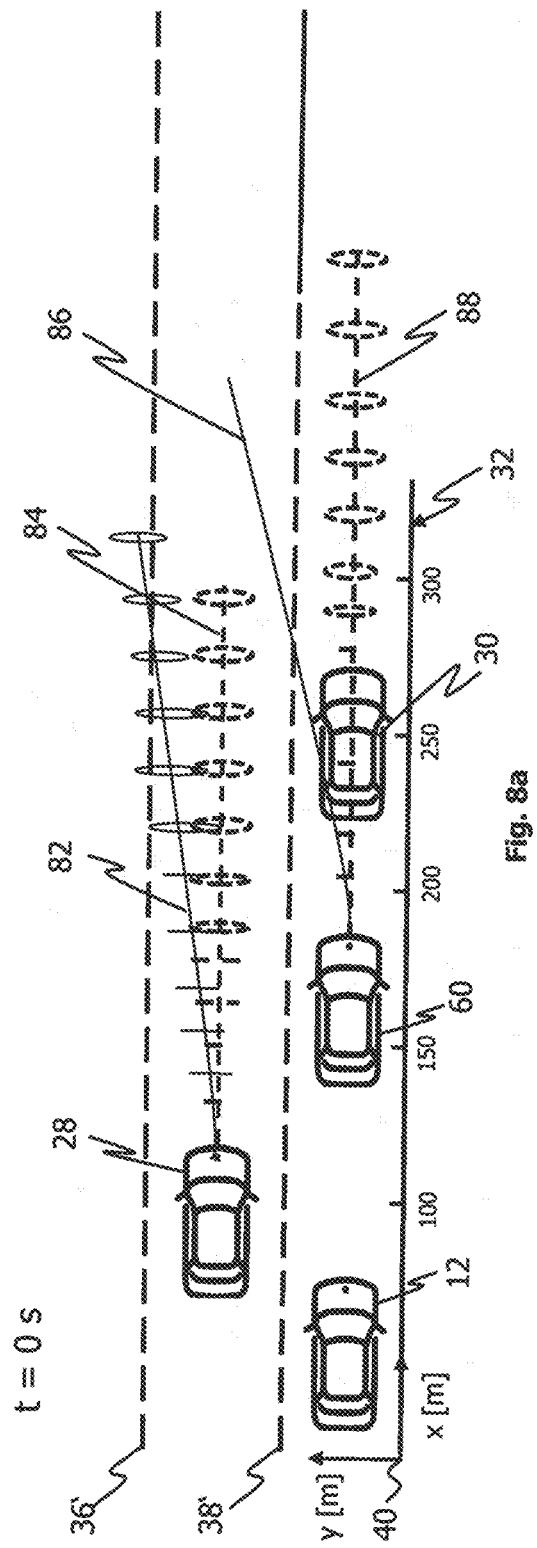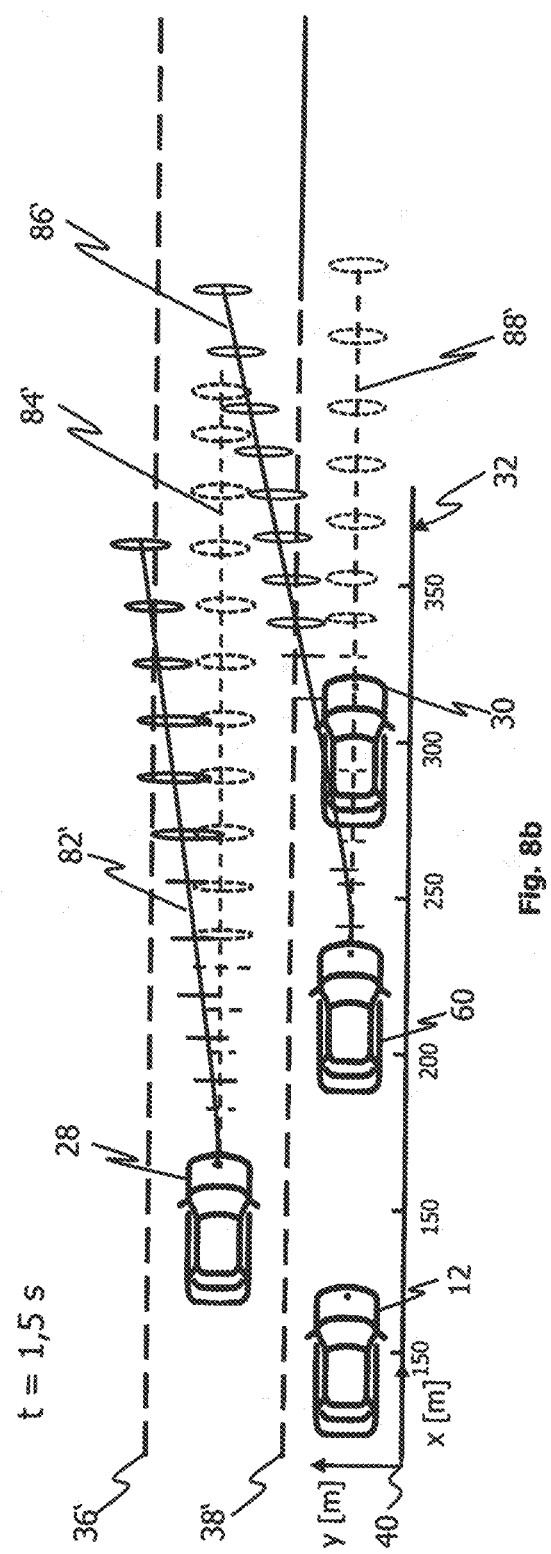

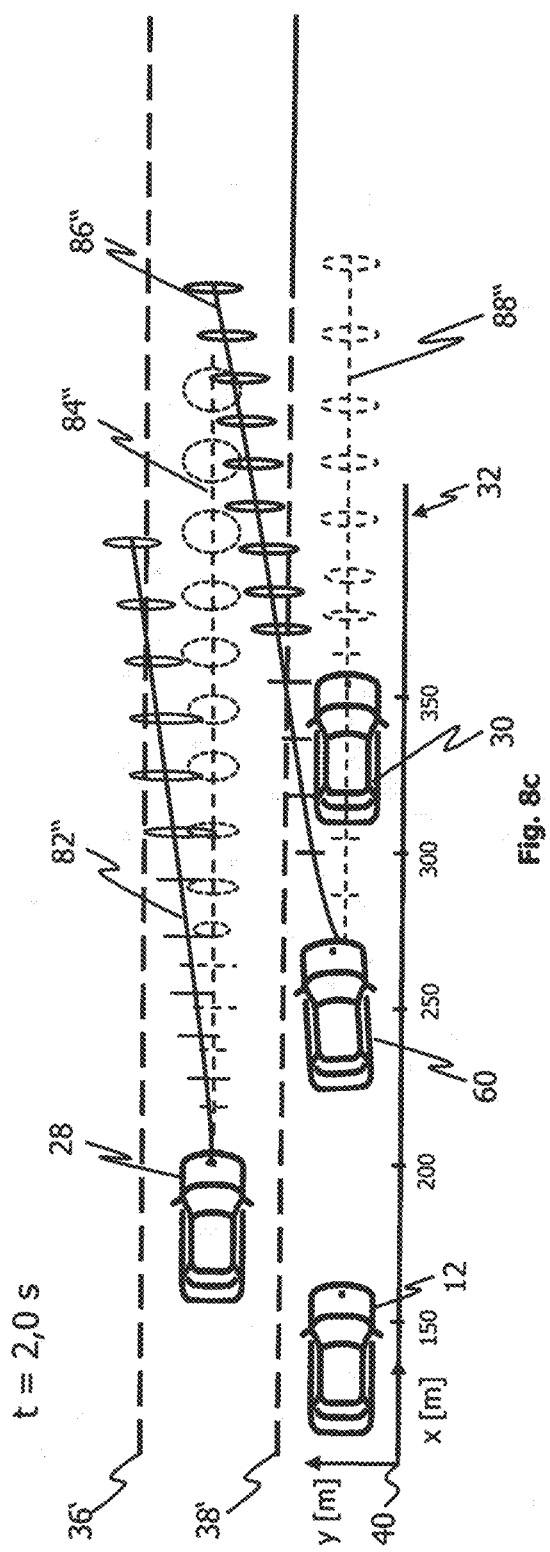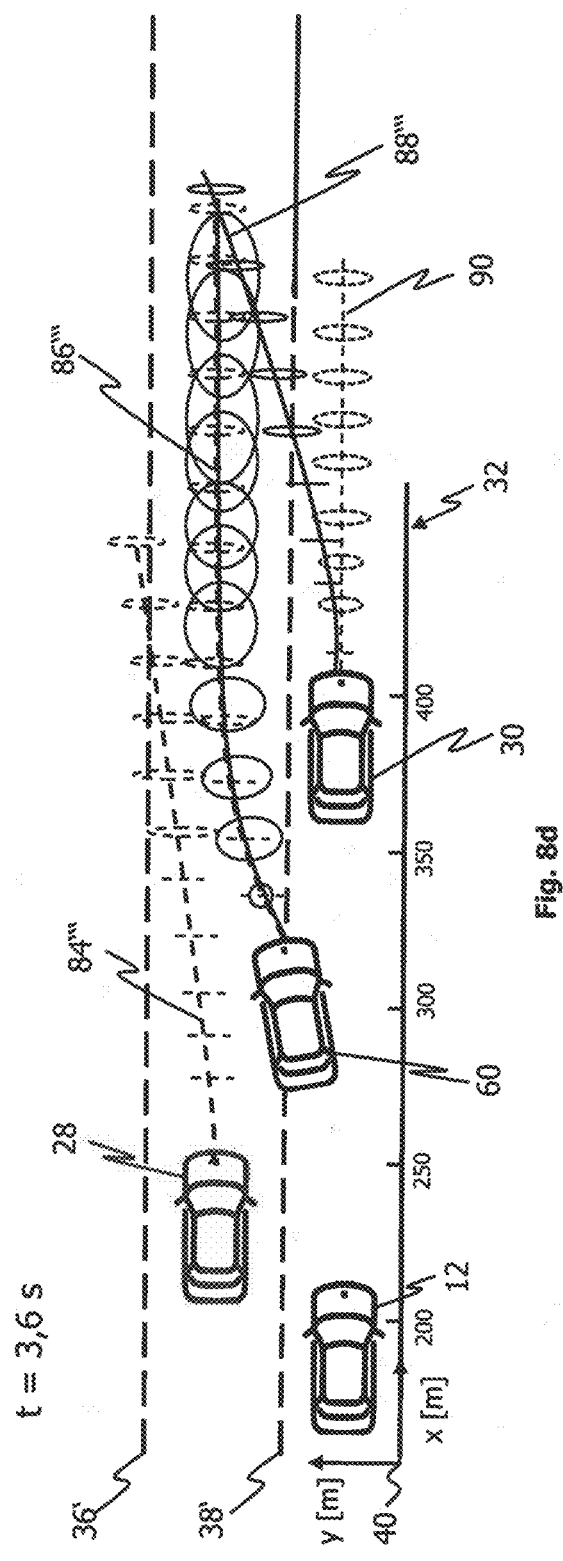

CONTROL SYSTEM AND CONTROL METHOD FOR INTERACTION-BASED LONG-TERM DETERMINATION OF TRAJECTORIES FOR MOTOR VEHICLES

RELATED APPLICATION

This application claims priority from German Application No. 10 2019 103 106.0, filed Feb. 8, 2019, the subject matter of which is incorporated herein by reference in its entirety.

BACKGROUND OF THE INVENTION

A control system and a control method for a host motor vehicle for monitoring a current traffic situation and for estimating its future development are described herein. The control system and the control method are based in particular on a surroundings sensor system in the host motor vehicle for assisting a driver or an autonomously traveling host motor vehicle with regard to interactions with other motor vehicles present in the traffic situation. For semiautonomous motor vehicles and autonomously controlled motor vehicles, the safety and driving comfort of the occupants of the host motor vehicle are increased due to improved decision-making and improved motion planning for the host motor vehicle.

PRIOR ART

In present-day traffic situations, it is increasingly common for motor vehicles controlled by human drivers to encounter at least semiautonomously controlled motor vehicles. Monitoring these traffic situations in a reliable, convenient manner and providing potential future driving maneuvers for each of the motor vehicles present in the situation represents a primary aspect in the preparation for and implementation of completely automated driving. Great importance is attached to anticipating the mentioned driving maneuvers for understanding of the current traffic situation, as well as to estimating the development of this traffic situation. Thus, in semiautonomously or autonomously controlled motor vehicles it is important to predict future states of other road users present in the surroundings of these motor vehicles in order to carry out suitable decision-making and motion planning for adapting the driving strategy for the semiautonomously or autonomously controlled motor vehicles, which meet all requirements for driving safety and driving comfort.

To this end, current advanced driver assistance systems (ADAS) in such motor vehicles provide a number of monitoring and information functions, for which purpose the surroundings of the motor vehicle, among other things, are monitored based on surroundings data obtained from one or more surroundings sensors situated on the motor vehicle.

In addition, the speed of the host (following) motor vehicle is adapted to the speed of the preceding (other) motor vehicle in so-called adaptive cruise control (ACC) systems via automatic speed control. A certain distance from the other motor vehicle is generally to be maintained. For this purpose, the stated systems determine a possible movement direction and/or a speed of the preceding motor vehicle in order to prevent the host motor vehicle from crossing the path of the preceding motor vehicle in such a way that a critical situation results. Trajectories or motion paths may then be derived from possible movement directions at certain points in time.

In motor vehicles driven by persons, the driver assistance systems usually provide an information function to warn the driver of a critical situation or a corresponding driving maneuver, or to propose a suitable driving maneuver to the driver for his/her motor vehicle. Similarly, the driver assistance systems may also be used in autonomously controlled motor vehicles to provide the autonomous control system with the appropriate surroundings data.

In particular when traveling on expressways and throughways, risky lane change or passing maneuvers, for example, represent a major accident hazard. In addition, lane narrowings as well as lane widenings on expressways result in traffic scenarios in which merging and/or deceleration maneuvers with high acceleration, at least in heavy traffic, may be necessary for the host motor vehicle. Thus, an exact prediction of the future vehicle status of every other motor vehicle present in the surroundings of the motor vehicle, in particular during lane change maneuvers and merging operations, allows an early adaptation of the driving strategy of the host motor vehicle. It is thus possible to minimize critical situations and avoid collisions.

The prediction of future motion paths (also referred to as trajectories) for road users present in the surroundings of the host motor vehicle is generally divided into physics-based approaches, maneuver-based approaches, and interaction-based approaches. The physics-based approaches estimate future states of each road user in the surroundings of the motor vehicle by applying a static or dynamic motion model, and therefore are suited primarily for short-term predictions.

Maneuver-based approaches initially determine the most likely future driving maneuver of the road users, in particular other motor vehicles, present in the surroundings of the host motor vehicle, or the intention for such a maneuver, and on this basis estimate a trajectory for the other motor vehicles without taking the interaction between the motor vehicles into account.

In the interaction-based trajectory planning, the interaction between road users is directly modeled. Thus, there is a possibility for improving the reliability of long-term predictions.

Underlying Problem

In road traffic, in particular on expressways and throughways, situations may occur that require a driver or an autonomous driver assistance system of a host motor vehicle to carry out a certain driving maneuver. For example, another, slower-moving motor vehicle that is merging into the lane of a host motor vehicle may necessitate a heavy braking operation or an abrupt evasive maneuver. Alternatively, an intense acceleration operation for the host motor vehicle may be necessary in order to pass the slower-moving, merging motor vehicle before the merging operation and thus avoid a collision. All of these driving maneuvers may undesirably trigger high acceleration forces that act on the occupants of the host motor vehicle, which in turn affect the driving comfort and ultimately, the safety of the occupants. In order to address this and allow a timely response to such a situation, efficient, precise monitoring of the current traffic situation by the host motor vehicle is necessary.

This current traffic situation in which the host motor vehicle is in is not constant, and in reality is constantly changing. Thus, as mentioned, other road users may, for example, change lanes or change speed intentionally or because they are forced to, which forces the host motor vehicle to make a corresponding driving maneuver. In addition, the current driving situation of the other road users, in particular other motor vehicles, in the surroundings of the host motor vehicle is changing due to the driving behavior of their drivers and/or a changing course of a lane currently being traveled in by each of the other motor vehicles.

Responding in an appropriate and timely manner to such changes in the current situation, and in particular to the driving behavior of the other motor vehicles, represents a major challenge for conventional driver assistance systems as well as for human drivers. In addition, with regard to the monitoring of the driving behavior of the other motor vehicles, a comparatively long, and at the same time reliable, planning horizon (also referred to as a planning period) provides important information for appropriate decision-making for possible maneuvers for the host motor vehicle. It is important to consider the particular interaction between the individual road users in the current traffic situation.

The object, therefore, is to provide a control system and a control method for a host motor vehicle which increase the driving safety and driving comfort of the host motor vehicle according to a current situation in which the host motor vehicle is in. To this end, it is not sufficient to merely detect the current driving situation. Rather, it is also necessary to make the most accurate predictions or estimations possible concerning future possible driving maneuvers and corresponding trajectories of other motor vehicles in the current driving situation.

Proposed Solution

This object is achieved by a control system having the features of claim 1 and a control method having the features of claim 9. Preferred embodiments will become apparent from subclaims 1 through 8 and 10 and the following description.

One aspect relates to a control system that is configured and intended for use in a host motor vehicle. This control system recognizes lanes, lane boundary lines, lane markings, and/or other motor vehicles, based on surroundings data obtained from at least one surroundings sensor situated on the host motor vehicle. The at least one surroundings sensor is configured for providing an electronic control unit of the control system of the host motor vehicle with surroundings data that reflect an area in front of, to the side of, and/or behind the host motor vehicle. The control system is at least configured and intended for determining at least one driving parameter for each other motor vehicle present in the surroundings of the host motor vehicle, based on the provided surroundings data, and to generate a plurality of possible trajectories for the future travel course for each of the other motor vehicles, based on the driving parameter determined in each case. Furthermore, the control system is at least configured and intended for carrying out a simulation of the plurality of possible trajectories for the future travel course for each of the other motor vehicles, and for grouping in each case the plurality of possible trajectories for the future travel course for each of the other motor vehicles, based on the simulation.

The control system may be configured and intended for determining the at least one driving parameter for each of the other motor vehicles as random parameters. The at least one driving parameter may in each case be a longitudinal driving parameter and/or a lateral driving parameter of each of the other motor vehicles. In addition, the at least one driving parameter may be a particular vehicle-internal parameter of the other motor vehicles in question, which is not directly detectable by the at least one surroundings sensor of the host motor vehicle.

For determining the plurality of possible trajectories for the future travel course for each of the other motor vehicles, the control system may be configured and intended for taking into account the roadway geometry of a roadway currently being traveled on by each of the other motor vehicles. Alternatively or additionally, during determination of the plurality of possible trajectories for the future travel course for each of the other motor vehicles, the control system may incorporate further context information such as traffic signs and/or traffic signals.

The grouping of the plurality of trajectories for each of the other motor vehicles may take place based on the spatial end points of the plurality of trajectories for each other motor vehicle. For example, the trajectories may be temporally grouped at the end of a planning horizon that is used. The planning horizon denotes the time period for which the future development of the current traffic situation is estimated.

For each of the plurality of grouped trajectories for each other motor vehicle, the control system may determine probabilities that the other motor vehicle in question actually follows this individual trajectory of the associated trajectory group in the future travel course. On this basis, the control system may be configured and intended for planning a driving maneuver for the host motor vehicle and/or determining a trajectory for the future travel course of the host motor vehicle. For this purpose, the control system may in particular take into account in each case, i.e., for each other motor vehicle, the individual trajectory from the plurality of grouped trajectories having the highest relative probability.

The simulation may include multiple simulation runs (also referred to as simulation cycles). Although the number of simulation cycles carried out is not limited, a relatively greater number of simulation runs may provide even more precise results in the determination of the plurality of trajectories for each of the other motor vehicles.

According to certain embodiments, the control system may also be configured and intended for determining a base maneuver for each of the other motor vehicles in the surroundings of the host motor vehicle, and generating a reference path for each of the other motor vehicles, based on the base maneuver determined in each case. In these cases, the control system may also be configured and intended for determining the at least one driving parameter for each other motor vehicle present in the surroundings of the host motor vehicle, based on the reference path of each of the other motor vehicles. The base maneuver may be lane keeping or a lane change, for example.

The control system may also be configured and intended for associating a property of a future possible driving maneuver with each of the other motor vehicles, based on the driving parameter determined in each case, and taking the property of the future possible driving maneuver into account in each case when generating the plurality of possible trajectories for the future travel course for each of the other motor vehicles.

The property of the future possible driving maneuver may be determined in particular from a probability distribution of future possible driving maneuvers. The future possible driving maneuvers may be lane keeping or a lane change, or a combined maneuver such as a passing maneuver made up of a sequence of the base maneuvers.

In these cases, the control system may be configured and intended for determining the property of the future driving maneuver for each of the other motor vehicles, using a maneuver classifier as a probability class.

According to certain exemplary embodiments, the at least one driving parameter may in each case include a current speed and/or a current acceleration of the other motor vehicles. The control system may then be configured and intended for determining the driving parameter, based on an underlying probability distribution.

The current speed as well as the current acceleration of each of the other motor vehicles may be a longitudinal speed and/or a lateral speed, or a longitudinal acceleration and/or a lateral acceleration, of the other motor vehicle in question relative to the lane it is currently traveling in. These speeds and accelerations may be determined by the control system of the host motor vehicle, for example as absolute values or as relative values in relation to the host motor vehicle.

In addition, the at least one driving parameter may include longitudinal and/or lateral distances of each of the other motor vehicles with regard to lane boundary lines of the lanes currently being traveled in by the other motor vehicles.

In certain embodiments, the control system may also incorporate a random value in each case when generating the plurality of possible trajectories for the future travel course for each of the other motor vehicles.

This may be an individual random value for each trajectory, which for example is added in each case to the generated trajectory. The random value may be the result of a Gaussian process. In other words, the random value may be a value randomly selected from multiple random values that follow a Gaussian distribution. In this way, deviations of the generated trajectories from the trajectories of the other motor vehicles actually followed may be taken into account, and in addition the different individual driving behaviors of the drivers of the other motor vehicles may be taken into consideration.

The control system may also be configured and intended for carrying out the simulation in the form of a predetermined number of Monte Carlo simulation cycles, and generating an individual trajectory of the plurality of trajectories for each of the other motor vehicles within the scope of a Monte Carlo simulation cycle.

According to certain exemplary embodiments, the at least one surroundings sensor may include a front camera, a rear camera, a side camera, a radar sensor, and/or a lidar sensor.

A further aspect relates to a control method, which in a host motor vehicle recognizes lanes, lane boundary lines, lane markings, and/or other motor vehicles, based on surroundings data obtained from at least one surroundings sensor situated on the host motor vehicle. The control method is carried out in particular by means of a control system described above. The control method includes at least the steps:
  determining at least one driving parameter for each other motor vehicle present in the surroundings of the host motor vehicle, based on the provided surroundings data,
  generating a plurality of possible trajectories for the future travel course for each of the other motor vehicles, based on the driving parameter determined in each case,
  carrying out a simulation of the plurality of possible trajectories for the future travel course for each of the other motor vehicles, and
  grouping in each case the plurality of possible trajectories for the future travel course for each of the other motor vehicles, based on the simulation.

Yet another aspect relates to a motor vehicle that includes a control system described above.

Compared to conventional driver assistance systems and other control systems used in motor vehicles for (semi) autonomous driving, the approach presented here increases the driving safety and driving comfort, since, based on the information contained in the surroundings data concerning lanes, lane boundary lines, lane markings, and/or other motor vehicles in the area in front of, to the side of, and/or behind the host motor vehicle, the entire direct surroundings of the host motor vehicle are monitored, and thus the current traffic situation is fully taken into account by the control system, in order to generate possible future trajectories of all motor vehicles present in the traffic situation. In other words, the future possible trajectories of the other motor vehicles (and subsequently also for the host motor vehicle) may be determined as an appropriate response to the current traffic situation in which the motor vehicles are present. The surroundings data obtained by means of the at least one surroundings sensor constantly change according to the actual traffic and driving situations.

In addition, compared to conventional driver assistance systems, improved estimations of the future development of the current traffic situation are made. This is achieved in particular in that interactions of the particular motor vehicles with one another are taken into account by the control system in determining the trajectories for the motor vehicles in question.

The simulation of the current traffic situation and its future development, taking into account the interaction of the motor vehicles, thus allows the use of a preferably realistic approach for trajectory determination, which also takes into consideration when objects, for example other motor vehicles or lane markings to be detected, are concealed to the surroundings sensor system of the host motor vehicle by other motor vehicles and therefore are not directly detectable. In addition, for all motor vehicles controlled by human drivers, the individual driving behavior in each case, in particular in many different traffic scenarios on throughways and/or expressways, may be taken into account and appropriate trajectories for these traffic scenarios may be generated. This is made possible in particular by incorporating probabilities of certain driving parameters when determining the trajectories. By taking into account the mutual interactions of the motor vehicles present in a traffic situation, even when available surroundings information is partially limited, an efficient and precise approach to monitoring and estimating the future development of the current traffic situation is provided.

It is apparent to those skilled in the art that the aspects and features described above may be combined in a control system and/or a control method. Although some of the above-described features have been explained with regard to a control system, it is understood that these features may also apply to a control method. Similarly, the features described above with regard to a control method may correspondingly apply to a control system.

BRIEF DESCRIPTION OF THE DRAWINGS

Further aims, features, advantages, and possible applications result from the following description of exemplary embodiments, which are not to be construed as limiting, with reference to the associated drawings. All features described and/or graphically illustrated, alone or in any combination, constitute the subject matter disclosed herein. The dimensions and proportions of the components shown in the figures are not to scale.

FIGS. 3a and 3b schematically show one possible development of the driving situation from FIG. 2 for two different future points in time according to certain exemplary embodiments.

FIGS. 7a and 7b schematically show an example of a driving situation and its future development, with a host motor vehicle and three other motor vehicles, as well as medians of a plurality of generated trajectories for the other motor vehicles, according to certain exemplary embodiments.

FIGS. 8a through 8d schematically show another example of a driving situation and its development, with a host motor vehicle and three other motor vehicles, as well as medians of a plurality of generated trajectories for the other motor vehicles when there is incomplete information about the driving situation, according to certain exemplary embodiments.

DETAILED DESCRIPTION OF THE DRAWINGS

Within the scope of the following disclosure, certain aspects are described primarily with regard to the control system. However, these aspects are of course also applicable within the scope of the disclosed control method, which may be carried out, for example, by a central control device (ECU) of a motor vehicle. This may take place by making suitable write and read access to a memory associated with the motor vehicle. The control method may be implemented within the motor vehicle as hardware or software, and also as a combination of hardware and software. Also included are digital signal processors, application-specific integrated circuits, field-programmable gate arrays, and other suitable switching and computing components.

Figure 1:
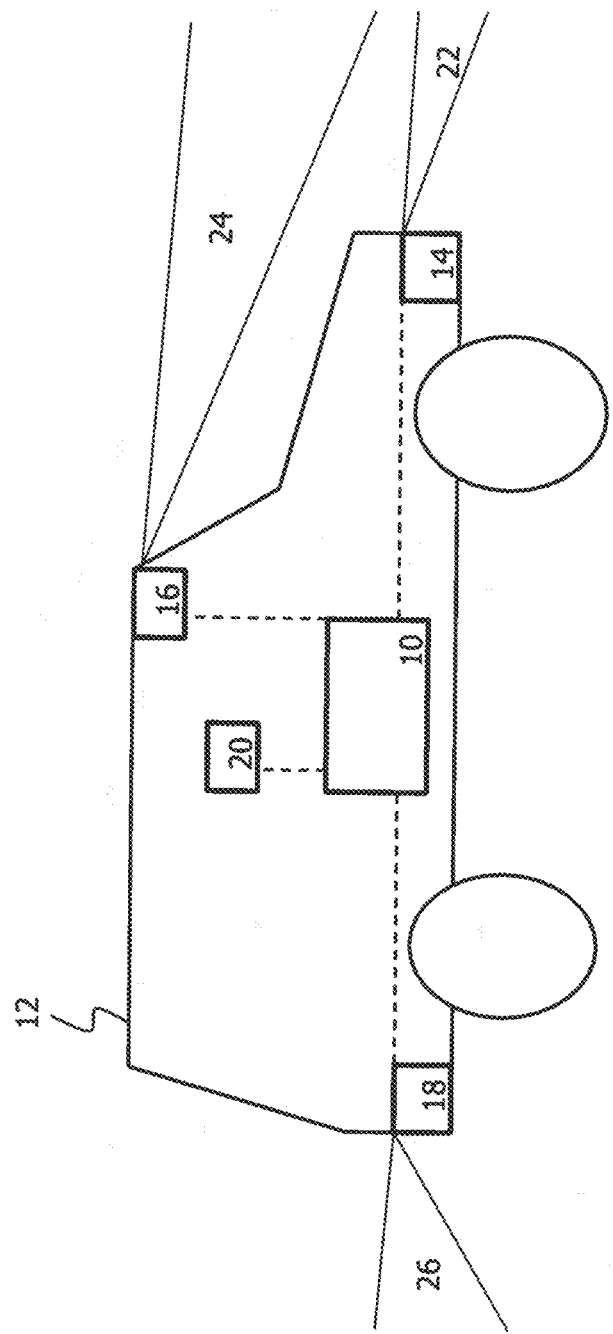
FIG. 1 schematically shows a motor vehicle that has a control system and at least one surroundings sensor according to certain exemplary embodiments.

FIG. 1 schematically shows a motor vehicle 12 (host motor vehicle) that includes a control system 10. The control system 10 is coupled to at least one surroundings sensor 14, 16, 18 situated on the motor vehicle 12 in order to obtain surroundings data from the at least one sensor 14, 16, 18. The control system 10 may include an electronic control unit (ECU), not illustrated in the figure.

For example, the present control system 10 may be at least configured and intended, with the aid of the ECU and/or other electronic control systems, for determining trajectories, i.e., future possible motion paths, via a current traffic situation for other motor vehicles present in the traffic situation in the surroundings of the host motor vehicle 12. For example, the ECU receives signals from the surroundings sensors 14, 16, 18, processes these signals and the associated surroundings data, and generates control signals and/or output signals.

FIG. 1 illustrates three surroundings sensors 14, 16, 18 which transmit appropriate signals to the control system 10 or the electronic control unit ECU. In particular, at least one surroundings sensor 14 that detects an area 22 in front of the motor vehicle 12 is situated on the motor vehicle 12 facing the front in the travel direction of the motor vehicle 12. This at least one surroundings sensor 14 may be situated, for example, in the area of a front bumper, a front light, and/or a front radiator grill of the motor vehicle 12. Thus, the surroundings sensor 14 detects an area 22 directly in front of the motor vehicle 12.

At least one additional or alternative surroundings sensor 16, likewise facing the front in the travel direction of the motor vehicle 12, is situated in the area of the windshield of the motor vehicle 12. For example, this surroundings sensor 16 may be situated between a rearview mirror of the motor vehicle 12 and its windshield. Such a surroundings sensor 16 detects an area 24 in front of the motor vehicle 12; depending on the design of the motor vehicle 12, an area 24 directly in front of the motor vehicle 12 cannot be detected due to the front section (or geometry) of the motor vehicle 12.

In addition, at least one surroundings sensor 18 may be situated at the side and/or the rear of the motor vehicle 12. This optional surroundings sensor 18 detects an area 26 to the side of and/or behind the motor vehicle 12 in the travel direction of the motor vehicle 12. For example, the data or signals of this at least one surroundings sensor 18 may be used to verify information that is detected by the other surroundings sensors 14, 16, and/or to determine a curvature of a lane traveled on by the motor vehicle 12.

The at least one surroundings sensor 14, 16, 18 may be implemented in any desired manner, and may include a front camera, a rear camera, a side camera, a radar sensor, a lidar sensor, an ultrasonic sensor, and/or an inertial sensor. For example, the surroundings sensor 14 may be implemented in the form of a front camera or a radar, lidar, or ultrasonic sensor. A front camera is particularly suited for the surroundings sensor 16 situated at a higher level, whereas the surroundings sensor 18 situated in the rear of the motor vehicle 12 may be implemented in the form of a rear camera or a radar, lidar, or ultrasonic sensor.

The electronic control unit ECU processes the surroundings data obtained from the surroundings sensor(s) 14, 16, 18 situated on the motor vehicle 12 in order to detect a lane traveled on by the motor vehicle 12 via a first and a second lateral lane boundary line in front of and/or behind the host motor vehicle 12. In addition, the electronic control unit ECU processes the surroundings data obtained from the surroundings sensor(s) 14, 16, 18 situated on the host motor vehicle in order to detect lanes traveled on by other motor vehicles (the lane adjacent to the lane traveled on by the host motor vehicle 12, where "adjacent" means that one or more further lanes may also be situated between the adjacent lanes), and its lateral lane boundary lines in front of and/or behind the host motor vehicle 12. For this purpose, the surroundings sensors 14, 16, 18 provide surroundings data to the electronic control unit ECU that represent the area in front of, to the side of, and/or behind the host motor vehicle 12.

To this end, the control system 10 is connected to the at least one surroundings sensor 14, 16, 18 via at least one data channel or bus (illustrated by dashed lines in FIG. 1). The data channel or bus may be implemented in a wired or wireless manner.

Alternatively or additionally, the control system 10 or its electronic control unit ECU may obtain data from one or more other assistance systems 20 or some other control unit 20 of the motor vehicle 12 which indicate or allow the derivation of the lanes traveled on by the host motor vehicle 12 and the other motor vehicles via their lateral lane markings. Thus, data and information already determined by other systems may be used by the control system 10.

In addition, the control system 10 or its electronic control unit ECU determines a driving situation (also referred to as a traffic situation) with the surroundings sensors, i.e., based on the surroundings data obtained using the at least one surroundings sensor 14, 16, 18. Here as well, an assistance system 20 or an electronic control unit 20 that is already present may alternatively or additionally supply data and/or information which define(s) a driving situation, or from which a driving situation may be quickly derived.

The driver assistance system 20 or the electronic control unit 20 may also be configured and intended for (semi) autonomously controlling the motor vehicle. In this case, the control system 10 is configured and intended for outputting data to the driver assistance system 20 or to the electronic control unit 20 for autonomous driving. In particular, the control system 10 (or its ECU) may output data to the component 20 that indicate the patterns of certain possible driving maneuvers and/or future possible movement paths (trajectories) for the other motor vehicles in the surroundings of the host motor vehicle 12. The data may likewise be transmitted via a data channel or bus in a wired or wireless manner.

Within the scope of the present disclosure, an efficient, precise approach to monitoring the current traffic situation by the control system 10 of the host motor vehicle 12 is provided. In addition, under this approach future possible trajectories for the other motor vehicles present in the traffic situation are generated, based on the current driving situation. A mathematical description of this approach for interaction-based trajectory determination is now provided with reference to FIG. 2.

Figure 2:
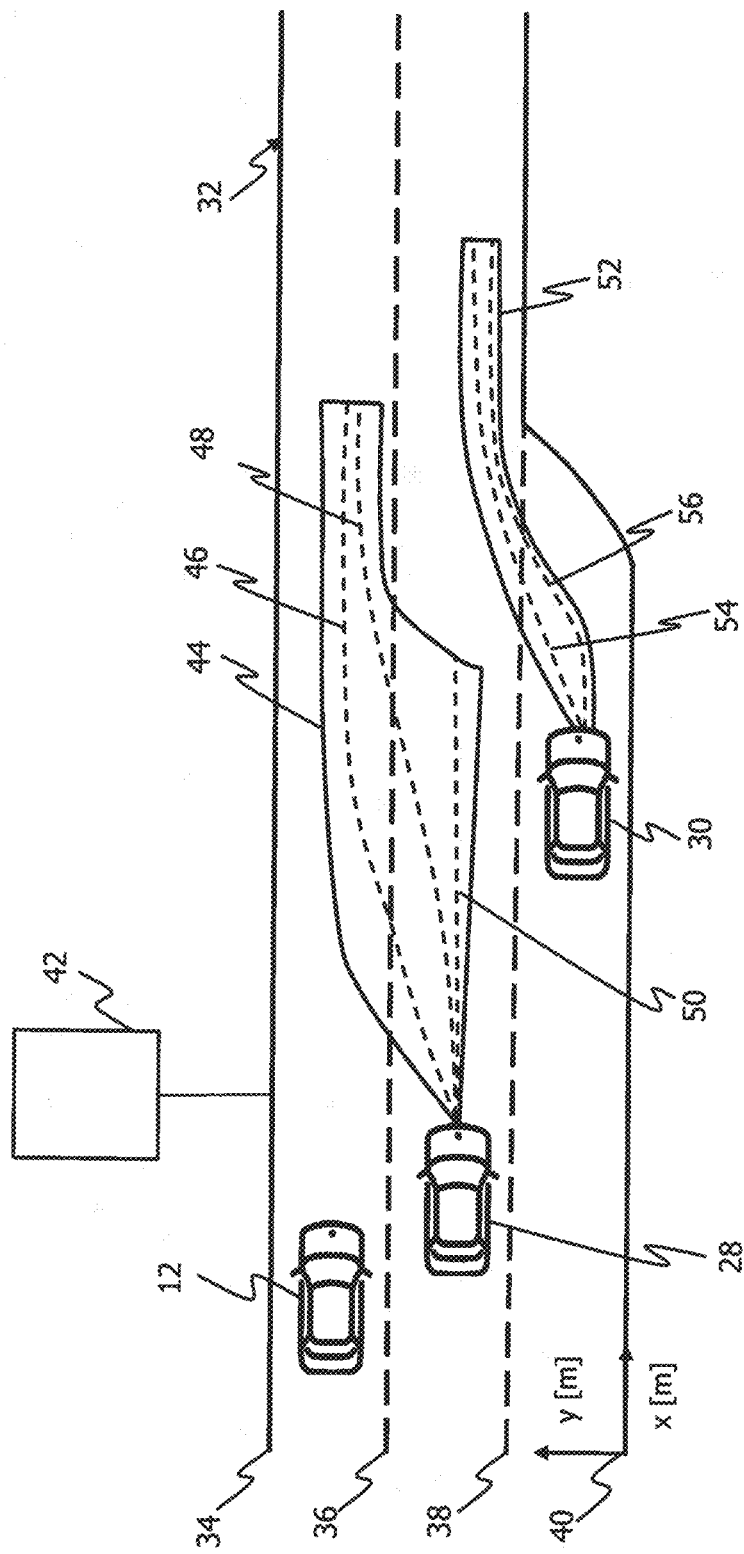
FIG. 2 schematically shows a driving situation with a host motor vehicle and two other motor vehicles, and various possible trajectories for the other motor vehicles according to certain exemplary embodiments.

FIG. 2 schematically shows a driving situation in which the host motor vehicle 12 is in the passing lane of a roadway 32 that narrows from two [sic; three] lanes to three [sic; two] lanes. The passing lane is laterally delimited by a left lane marking 34 and a right lane marking 36. At that moment another (second) motor vehicle 28, traveling more slowly than the host motor vehicle 12, is in the center lane of the roadway 32, which is delimited by the left lane marking 36 and the right lane marking 38. A further (third) motor vehicle 30 is in the right lane of the roadway 32. This right lane ends shortly in front of the third motor vehicle 30, which is apparent from the convergence of its left and right lane markings 38, 40.

Thus, in the traffic situation illustrated in FIG. 2, by way of example two other motor vehicles 28, 30 are present in the surroundings of the host motor vehicle 12. However, the present disclosure is not limited to two other motor vehicles in the surroundings of the host motor vehicle. Rather, within the scope of the present disclosure, future possible driving maneuvers and/or future possible motion paths, i.e., trajectories, may be monitored or predicted (i.e., estimated in advance) for all motor vehicles present in the direct surroundings of the host motor vehicle 12.

The basic mathematical principles of the presented approach are now further described with reference to FIGS. 2 through 4b. For a given set of K motor vehicles (also referred to below as agents) in a current driving situation $\mathcal{N} = \{N_0, N_1, \ldots, N_K\}$, where $N_0$ denotes the host motor vehicle 12 and each agent has a state $x^{(k)}(t) \in \mathbb{R}^t$ at time t, the future states of all agents $x^{(k)}(\tau)$ for $k \in \{1, 2, \ldots K\}$ and $\tau \in [t, t_p]$ within the planning horizon $t_p$ are established.

All agents are in a random traffic situation S (as illustrated in FIG. 2, for example) which takes into account the roadway geometry and additional context information concerning driving decisions to be made, for example the road sign 42. In addition, other objects detected by the at least one surroundings sensor 14, 16, 18, such as traffic lights or other traffic signals, may be included in this context information. The traffic situation (also referred to as the traffic scenario) as well as the associated context information may, but within the scope of the present disclosure do not have to, be based solely on the surroundings data provided by the at least one surroundings sensor 14, 16, 18. Alternatively or additionally, digital map information that is suitably provided to the electronic control unit of the control system 10 may be incorporated into the random traffic scenario.

In order to move within the current traffic scenario as time progresses, each agent or its vehicle-internal systems set(s) a longitudinal acceleration $a_x^{(k)}(\tau) \in [-a_{max}, a_{max}]$ for the agents. The longitudinal direction corresponds to the travel direction of the motor vehicles 12, 28, and 30 along the roadway 32, i.e., in the x direction (see FIG. 2). In other words, a longitudinal acceleration is assigned to each of the agents by its vehicle-internal systems.

In addition, a lateral driving maneuver $m^{(k)}(\tau) \in \mathcal{M}$ at time τ is carried out, where $\mathcal{M}$ represents a set of possible driving maneuvers, i.e., contains all possible lateral driving maneuvers for the agents. Elements of this set of driving maneuvers may be lane keeping or a lane change, for example, wherein the latter may be divided into the elements lane change to the left and lane change to the right. The lateral direction extends transversely with respect to the travel direction of the motor vehicles 12, 28, and 30 along the roadway 32, i.e., in the y direction (see FIG. 2).

Based on the lateral driving maneuver, at least one executable movement path through the traffic situation, involving a lateral acceleration of the agent (thus, which is necessary) in order to follow the path, is then derived. A plurality of these movement paths for the motor vehicle 28 is denoted by reference numerals 46, 48, and 50 in FIG. 2. Similarly, reference numerals 54 and 56 denote possible movement paths for the motor vehicle 30. The envelopes 44 and 52 illustrated as solid lines represent the outer boundaries in which the executable trajectories are allowed to move in the current driving situation.

The lateral and longitudinal accelerations result in the transition from the state $x^{(k)}(t)$ to the chronologically successive state via a state transition model $x^{(k)}(t+\Delta t) = f(x^{(k)}(t), a^{(k)}(t)): \mathbb{R}^{t \times 2}$, where the acceleration or the acceleration vector is defined by $a^{(k)} = [a_x^{(k)}, a_y^{(k)}]^T$.

Longitudinal accelerations as well as lateral driving maneuver decisions and their execution are also based on individual preferences and the individual driving behavior of the drivers of the particular agents, and the current traffic situation, resulting in uncertainties in predicting the development of this traffic situation. For this reason, the longitudinal accelerations ($a_x^{(k)}$) and the lateral driving maneuvers ($m^{(k)}$) of the agents are modeled as follows, based on corresponding distributions.

$$a_x^{(k)}(\tau) \times P(a^{(k)}(\tau) | x^{(k)}(\tau), \mathcal{N}, S$$

$$m^{(k)}(\tau) \times P(m^{(k)}(\tau) | x^{(k)}(\tau), \mathcal{N}, m^{(k)}(\tau-1))$$

These distributions are a function of the current system state (also referred to as the vehicle state) of the host motor vehicle 12 (host agent), of the other agents (other motor vehicles) in the current traffic situation, and the interactions of all agents.

The interactions between the agents characterize how the particular lateral and longitudinal driving maneuvers of an agent influence the driving behavior of at least one other agent. Thus, with the approach presented here, the most precise estimations possible of the future development of the current traffic situation may be achieved by predicting possible trajectories for all agents that are present in the traffic situation.

One example of such an interaction is provided with reference to FIGS. 2 through 4b; FIGS. 3a and 3b and 4a and 4b represent two different possible future developments of the current traffic situation from FIG. 2, both of which are taken into account in the approach, presented within the scope of the present disclosure, for the interaction-based trajectory determination.

With regard to the above-discussed uncertainties due to individual driving characteristics and the current traffic situation, the following points must be taken into account, at least in agents controlled by drivers.

First, the driving maneuver decisions of the other motor vehicles 28, 30 in the traffic situation are unknown to the control system 10 of the host motor vehicle 12, and may vary within the same situation, depending on the driving preferences of the driver of the particular other motor vehicle 28, 30. Second, the uncertainties also vary in the execution of the corresponding driving maneuvers of the other motor vehicles 28, 30, depending on the driver preferences. Third, certain uncertainties arise in the estimation of starting states for trajectories of the motor vehicles 28, 30 due to sensor noise of the at least one surroundings sensor 14, 16, 18 of the host motor vehicle 12.

Within the scope of the present disclosure, one, two, or all of these points may be taken into consideration when predicting future movement paths of the other motor vehicles 28, 30.

In particular, the first two of the above-mentioned points are included in the described approach for trajectory determination for the motor vehicles 28, 30. The distribution over the future system states of all agents in the current traffic situation $Px^{(k)}(t)$, where $k \in \{1, 2, \ldots, K\}$, $\tau \in [t, t_p]$, is approximated by n repeated simulations of the development of the traffic situation, using probability-based driver models.

The individual computation steps carried out by the control system 10 for determining possible movement paths for the other motor vehicles 28, 30 are explained below.

A motion model is initially determined. The current state of the agent $N^{(k)}$ (for example, one of the motor vehicles 28, 30) is defined as $x^{(k)} = [x, y, \dot{x}, \dot{y}]^T$, and describes the (in each case lateral and longitudinal) position and also speed of this agent. Estimating the state in the next time instance (for example, in the next measuring or planning cycle or time increment) requires a state transition model that describes the movement of the agent in question with sufficient accuracy and without great computational effort. For example, if no communication takes place between the motor vehicles 12, 28, 30, and the control systems of the particular motor vehicles are limited to determining their vehicle states on the onboard sensor system, which may, but does not have to, be the case in the approach presented here, the internal states of the other agents, for example a steering angle, are not known to the particular agents.

For this reason, a mass point model is selected that allows sufficient accuracy and at the same time involves a low computational effort. This point mass is mathematically defined as follows:

$$\dot{x}^{(k)} = \begin{bmatrix} 1 & 0 & \Delta t & 0 \\ 0 & 1 & 0 & \Delta t \\ 0 & 0 & 1 & 0 \\ 0 & 0 & 0 & 1 \end{bmatrix} x^{(k)} + \begin{bmatrix} \frac{\Delta t^2}{2} & 0 \\ 0 & \frac{\Delta t^2}{2} \\ \Delta t & 0 \\ 0 & \Delta t \end{bmatrix} \begin{bmatrix} a_w^{(k)} \\ a_y^{(k)} \end{bmatrix},$$

where $a_x^{(k)}$ and $a_y^{(k)}$ represent the longitudinal acceleration and lateral acceleration, respectively, of the agent $N^{(k)}$.

It is apparent from FIGS. 3a and 3b (the latter shows the situation from FIG. 3a at a later time instance compared to FIG. 3a) that the second other motor vehicle 28 is making a lane change to the left lane of the roadway 32, following a trajectory within the trajectory distribution 44' (also referred to as a grouping) (FIG. 3a) or 44" (FIG. 3b), since the third other motor vehicle 30, due to the right lane of the roadway 32 ending, merges into the center lane of the roadway 32 and follows a trajectory within the grouping 52' (FIG. 3a) or 52" (FIG. 3b). The host motor vehicle 12 is still in the left lane of the roadway 34, and may, for example, follow behind the second other motor vehicle 28 with speed control in order to maintain a constant distance from the second other motor vehicle 28.

Figure 4A:
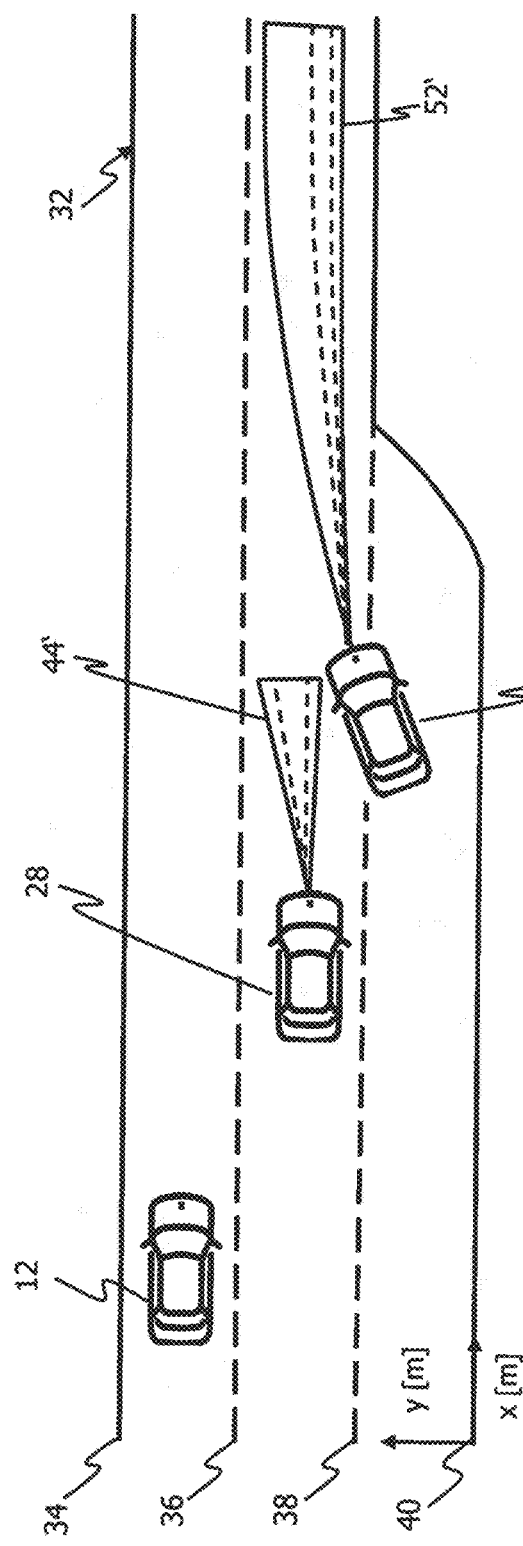
FIGS. 4a and 4b schematically show another possible development of the driving situation from FIG. 2 for two different future points in time according to certain exemplary embodiments.
Figure 4B:
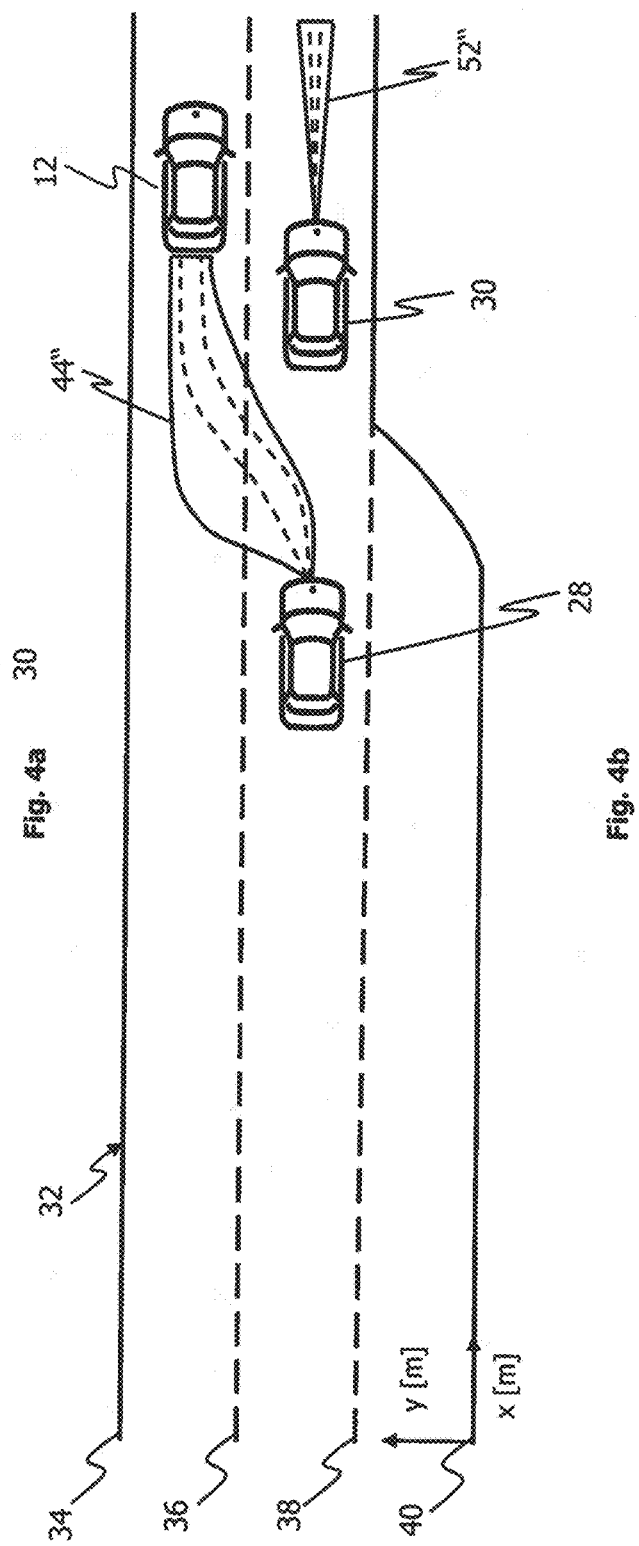

The development of the scenario that originated in FIG. 2 is different in FIGS. 4a and 4b. In this case, the driver or a driver assistance system decelerates the second other motor vehicle 28 to allow the third other motor vehicle 30 to merge into the center lane of the roadway 32, thereby maintaining a certain predefined safety distance. This is achieved by following a trajectory that is within the distribution 44' (FIG. 4a). As a result, the second other motor vehicle 28 is passed by the host motor vehicle 12, since the left lane of the roadway 32 is open. Only then (see FIG. 4b) can the second other motor vehicle make a lane change to the left, into the passing lane of the roadway 32, by following a trajectory within the distribution 44", in order to pass the third other motor vehicle 30. It is thus possible for the second other motor vehicle 28 to follow behind the host motor vehicle 12 with speed control, in a reverse procedure from the example shown in FIGS. 3a and 3b. For the third other motor vehicle 30, the interaction with the surroundings and with the other motor vehicles 12, 28 results in possible trajectories for the current driving situation, which are situated within the distributions 52' (FIG. 4a) and 52" (FIG. 4b).

In order to determine or produce a suitable longitudinal acceleration (for following the above-mentioned paths or trajectories) for each of the agents in the current traffic situation of the host motor vehicle 12, within the scope of the present disclosure the interaction between the agents or road users in the current traffic situation is taken into account. This takes place by means of the longitudinal acceleration model (also referred to as a longitudinal driver model) presented below. In this intelligent longitudinal driver model, it is assumed in particular that a (human) driver in a particular traffic situation, for example in which is there is risk of a collision, preferentially carries out a braking maneuver instead of, for example, risking or even causing a collision by accelerating. In other words, in the approach presented here for interaction-based trajectory determination, a collision-free longitudinal driver model is selected for modeling the driving behavior of the drivers of the particular agents. The mathematical descriptions for longitudinal movements of the particular agents are given as follows:

$$a_z^{(k)} = a_{max}\left[1 - \left(\frac{v^{(k)}}{v_{deo}^{(k)}}\right)^\delta\right] - a_{max}\left(\frac{s^*(v^{(k)}, \Delta e^{(k)})}{s^{(k)}}\right)^2$$

$$s^*(v^{(k)}, \Delta v^{(k)}) = s_0 + v^{(k)}T^{(k)} + \frac{v^{(k)}\Delta v^{(k)}}{2\sqrt{a_{max}b}},$$

where the parameter $a_{max}$ represents the maximum possible acceleration of a particular agent, and the parameter b represents a (negative) comfortable acceleration value for the agents in question. In other words, the parameter b is the maximum negative acceleration that should or is allowed to act on the occupants of a particular agent in the current driving situation in order to at least avoid injuries and ensure a high level of driving comfort for the occupants.

The parameter $s_0$ represents the minimum safety distance that an agent is to maintain from a particular preceding agent, and $T^{(k)}$ denotes the time (gap time) in which a certain distance is traveled or a gap with respect to another agent is to be closed $v_{des}^{(k)}$ is the desired speed in the particular driving situation, and δ is an additional (optional) adaptation factor, which within the scope of the exemplary embodiments of the present disclosure is set to 4, provided that no other adaptation factor is defined in the individual exemplary embodiments. All mentioned parameters of the longitudinal driver model are combined to form a vector $\theta_{long}$.

For other motor vehicles (for example, the other motor vehicles 28 and 30 from FIGS. 2 through 4b) that are monitored in a current traffic situation by the host motor vehicle 12 by means of its surroundings sensor system, although these parameters are not detected by the surroundings sensor system of the host motor vehicle, they still influence the driving behavior of these other motor vehicles to a great extent. For this reason, the driver model used here is divided into two parts. The first part relates to the driving behavior in light traffic and an at least essentially open roadway in front of the host motor vehicle 12, and the second part describes the driving behavior in heavy traffic and/or a traffic jam.

With regard to the driving behavior in light traffic (free-flow behavior), the above-mentioned desired speed $v_{des}^{(k)}$ of a particular agent influences the longitudinal acceleration of this agent to a great extent. However, it also plays an important role in the decision-making, described below, for lane change maneuvers of the particular agents. To generally ensure a high level of variability of various longitudinal and lateral driving maneuvers of the monitored agents, the present approach for interaction-based trajectory determination takes into account the desired speed $v_{des}^{(k)}$ of the particular agents as a normal distribution. This normal distribution is determined by the control system 10 of the host motor vehicle, based on the currently measured speed of the particular agent. This is given mathematically as follows:

$$P(v_{des}^{(k)} = u(v^{(k)} - \sigma_{des}v^{(k)}, v^{(k)} + \sigma_{des}v^{(k)}),$$

where $\sigma_{des}$, as a parameter, describes the range of possibly desired speeds. Within the scope of the present disclosure, the parameter $\sigma_{des}$ may either be determined from data ascertained in the travel course of the host motor vehicle 12, or may be set to a value of 0.2, for example. To ensure the variability even in traffic situations with heavy traffic, the time $T^{(k)}$ is also modeled using a normal distribution about a precalibrated value, not described here in greater detail. All other mentioned parameters are freely selected according to suitable models, and are not changeable. The above-described parameters are suitable in particular for traffic scenarios in which the other motor vehicles 28, 30 are passenger vehicles. However, the present disclosure is not limited thereto. Thus, the parameters for an interaction-based approach for trajectory determination which includes other motor vehicles such as trucks and/or motorcycles may be changed. One example of such is a generally lower maximum possible longitudinal acceleration of a truck compared to a passenger vehicle.

In addition to the longitudinal acceleration model, a lateral acceleration model (also referred to below as a lateral driver model or lane change model) is also used for monitoring the current traffic situation of the host motor vehicle 12 and resulting decision-making for a motion path to be followed for the host motor vehicle 12. In this way, even better predictions may be made by the control system 10 of the host motor vehicle 12 concerning the driving behavior and/or the future possible trajectories of the other agents in the surroundings of the host motor vehicle.

On expressways and/or throughways, in particular three possible primary maneuvers (also referred to as base maneuvers), namely, lane keeping (SH), a lane change to the left (SWL), and a lane change to the right (SWR), are taken into account. Thus, for the approach presented here for estimating the future development of the current traffic situation of the host motor vehicle 12, a set of primary or base maneuvers of $\mathcal{M} = \{SH, SWL, SWR\}$ results. Optionally, maneuvers having a more complex composition, for example a passing operation (made up of two lane changes and a lane keeping operation) may be defined. However, these complex maneuvers may also be represented as a sequence of the base maneuvers; in the case of the mentioned passing operation, this results, for example, in the sequence: lane change to the left—lane keeping—lane change to the right, which may be represented using the set of the base maneuvers $\mathcal{M}$.

The lane change model is used to determine the most likely driving maneuver for each agent in the current traffic situation, based on the measured vehicle states of the particular agents. During a subsequent simulation (a Monte Carlo simulation, for example) of the current traffic situation and its development, the lane change model is thus carried out in each simulation step in order to represent a sequence of combined maneuvers.

Since within the scope of the present disclosure, reliable long-term planning, i.e., a planning horizon longer than that used in conventional control systems, is implemented, the lane change model takes into account the interaction between the agents (i.e., each interaction between each one of the agents). In addition, for example road signs and/or roadway geometries or topologies may be taken into account which are recognized by the at least one surroundings sensor 14, 16, 18 of the host motor vehicle 12 and provided to the control system 10. Alternatively or additionally, such information concerning the road signs and/or roadway geometries or topologies may be provided to the control system 10 of the host motor vehicle 12 by other control systems of the host motor vehicle 12.

The requirements for the lane change model on the one hand are an at least relatively low computational effort to allow essentially real-time computations to be carried out. On the other hand, the lane change model should be made up of as few parameters as possible, since some or many of these parameters describe the individual driving behavior of the agent, and therefore are not directly detectable by the surroundings sensor system of the host motor vehicle 12. Lastly, the specific circumstances for traveling on German expressways, for example high relative speeds (due to a lack of a maximum speed limit) and the requirement for slower-moving traffic to travel in the rightmost lane, are taken into consideration. Thus, within the scope of the present disclosure, a model that generally minimizes deceleration maneuvers caused by lane changes is selected as a lane change model.

This lane change model in particular manages without the use of a large number of parameters, since it is based in particular on accelerations that are determined by means of the longitudinal acceleration model described above. It is suitable for both symmetrical and asymmetrical traffic, and allows at least a reduction, compared to conventional control systems, in the resource consumption and the computing time required by the control system 10 for determining motion paths for all agents of a traffic situation.

Within the scope of the lane change model, a safety criterion is modeled as $a_{LC}^{TF} \geq -b_{safe}$, where $a_{LC}^{TF}$ describes the deceleration (negative acceleration) of an agent that is caused or brought about by a possible lane change by another agent $N_k$ toward its target lane. $b_{safe}$ is a model parameter, not described in greater detail within the scope of the present disclosure, for the agent $N_k$. The safety criterion thus describes the maximum acceptable deceleration by the agent that must decelerate when the agent $N_k$ makes the lane change.

The lane change decision is modeled similarly as for the safety criterion. This takes place based on a possible intensification or increase in the acceleration due to a lane change of an agent, and is described with reference to FIG. 5. For asymmetrical traffic, the criterion for a lane change to the left is defined as follows:

$$a_{LC}^{(k)} - a^{(k)} + \rho^{(k)}(a_{LC}^{LF} - a^{LF}) > \Delta a_{th} + \Delta a_{bias}$$

The criterion for a lane change to the right is defined as follows:

$$a_{LC}^{(k)} - a^{(k)} + \rho^{(k)} a_{LC}^{F} - a^{F}) > \Delta a_{th} - \Delta a_{bias},$$

where $a_{LC}^{(k)}$ denotes the acceleration of the agent (identified by reference numeral 12' in FIG. 5) after a future possible lane change, and $a^{(k)}$ denotes this acceleration of the agent (identified by reference numeral 12 in FIG. 5) without a lane change. $a^{LF}$ is the resulting acceleration of the motor vehicle (agent) 60 in the left lane of the roadway 32, and $a^F$ corresponds to the resulting acceleration of the motor vehicle 28 in the right lane of the roadway 32. The expressions $\rho^{(k)}$, $\Delta_{a_{th}}$, and $\Delta_{a_{bias}}$ are model parameters, the latter two being predetermined, but not described in greater detail within the scope of the present disclosure.

Also for the lane change model, all parameters are combined into a vector $\theta_{lat}$. Since the parameters once again are not measurable, the lane change model describes a certain variability in the individual driving behavior of the various agents. In addition to the fixed parameters $\Delta_{a_{th}}$ and $\Delta_{a_{bias}}$ the parameter that most influences the individual driving behavior is modeled as a distribution, based on similar considerations as for the longitudinal acceleration model. This parameter of greatest influence is the courtesy factor $\rho^{(k)}$ which is modeled as follows, based on theoretical probability considerations:

$$P(\rho^{(k)}) = U(0,1)$$

Based on the roadway geometry, the information concerning the other agents in the current driving situation, and the obtained parameter (or the multiple obtained parameters), the lane change model then estimates a particular maneuver for each agent in every simulated time increment, for example in every planning cycle. As described, a predetermined value is assigned to some of these obtained parameters, while others of these obtained parameters are variable and are based, for example, on a probability distribution from which these parameters are selected randomly or according to predetermined criteria.

Not only the uncertainties in the maneuver selection, which are taken into consideration within the scope of the lane change model, but also the uncertainties in the maneuver execution by an agent must be compensated for to the greatest extent possible in the monitoring of the current traffic situation by the control system 10 of the host motor vehicle 12.

For carrying out the predicted or estimated driving maneuver of an agent, a path $p_m^{(k)}$ is generated which the agent for a current simulation instance (i.e., a simulation or planning cycle) is to follow. As mentioned, the driving maneuvers in question are either a lane change or a lane keeping operation. The techniques for path generation (also referred to below as reference path), used in the approach presented here for interaction-based trajectory planning, are outlined below.

For a lane keeping operation, the best prediction results for the center of a particular lane in which an agent is traveling are obtained. In order to also take into account the orientation of the agents (in particular their longitudinal axes) relative to their lanes being traveled in in the particular traffic situation, the path is computed using a third-order polynomial. The criteria for the polynomial correspond to the current system state of the particular agent as starting conditions, as well as staying in the center of the lane currently being traveled in by the agent, with an orientation of the longitudinal axis of the agent in the x direction, i.e., along the roadway 32, as an end condition.

Figure 5:
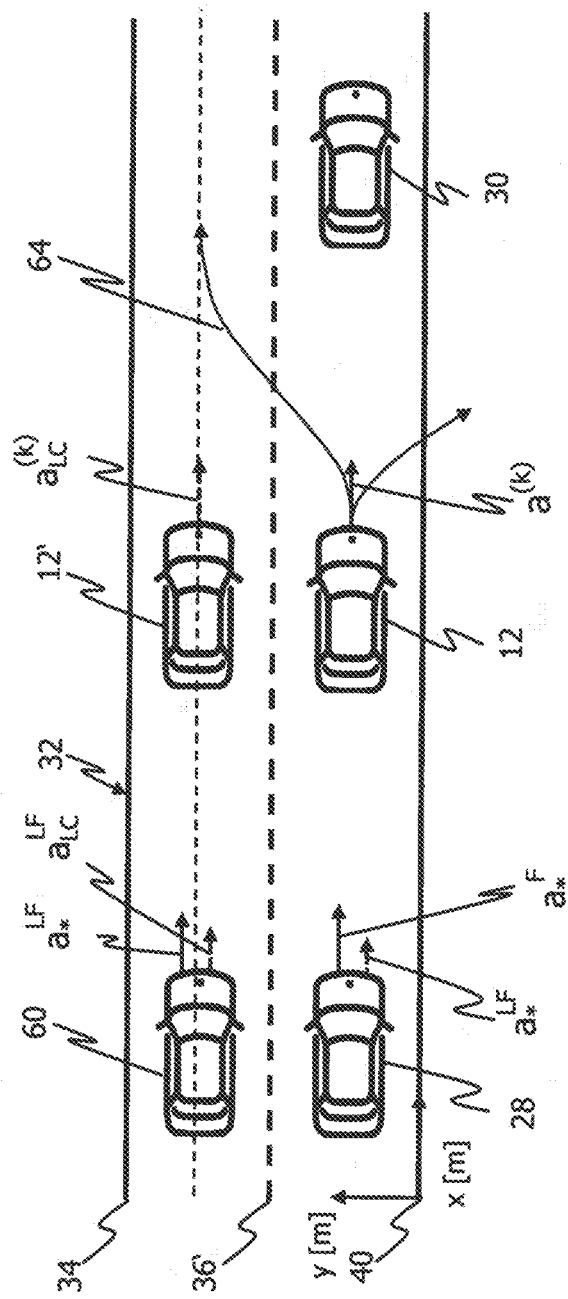
FIG. 5 schematically shows accelerations of other motor vehicles in the surroundings of the host motor vehicle, determined by the control system of the host motor vehicle in a current traffic situation.

For a lane change maneuver, the resulting path is likewise characterized by a third-order polynomial, the end condition resulting as shown in FIG. 5; after the lane change, the motor vehicle 12 should be in the center of the left lane of the roadway 32 (shown by the dashed line between and parallel to the lane markings 34 and 36' in FIG. 5). This is achieved by following the trajectory 64.

To additionally take into account the individual driving behavior of the particular agents during the maneuver execution, a random sample (an output value, for example) of a Gaussian process (GP) $l_{GF}$ is added to every possible determined path or to every possible determined trajectory. For this purpose, the basic mathematical principles are outlined below.

A Gaussian process is defined as a collection or set of random variables, wherein an infinite set of these random variables always follows a Gaussian normal distribution. The Gaussian process $f(x) \times GP(m(x), k(x,x'))$ is completely described by the median $m(x)$ and the covariance function $k(x, x')$. This is represented mathematically as follows:

$$m(x) = \mathbb{E}[f(x)]$$

$$k(x,x') = \mathbb{E}[(f(x)-m(x))(f(x')-m(x'))]$$

To model various maneuver executions of the particular agents, the sample of the Gaussian process represents deviations from the estimated maneuver path $p_m^{(k)}$. Therefore, the function for the median (or also for the mean value) is set to zero, and the sample is added to the path. The covariance function takes the extent of the change of the underlying function into account, and is defined by the function type and the function parameters (also referred as hyperparameters $\theta_H$). For the covariance function, as described below a combination of quadratic exponential functions is selected which controls the smoothness of the generated paths necessary for the driving comfort and driving safety of the particular agents, and provides a suitable degree of variability.

$$k(x, x') = \sum_{i=1}^{n_{GP}} \sigma_{f,i}^2 \exp\left(\frac{-(x-x')^2}{2l_i^2}\right),$$

where $\sigma_{f,i}$ denotes the maximum variance for component i of the function and $l_i$ denotes the corresponding length scale. For relatively small values of $l_i$, the function generally tends to change with a higher probability within a constant distance. The hyperparameters OH are estimated based on previously recorded data, for example. The recorded data may be stored, for example, in a memory connected to the control system 10. The estimation takes place by maximizing a logarithmic probability function. As soon as the parameters are found, a sample of the Gaussian process is created in a suitable manner.

For the maneuver types comprising lane keeping and lane change (in this case, the latter is not further divided into the maneuvers lane change to the left and lane change to the right), a covariance function having a component $\eta GP=2$ is used, and the parameters are estimated with regard to and/or based on previously determined information that is obtained from the surroundings data, for example, and available to the control system 10. This available information contains recorded data concerning lane change maneuvers as well as lane-keeping maneuvers. This results in the parameters, listed in the table below, for a lane change maneuver ("Lane Change" in the table) and a lane change [sic; lane-keeping] maneuver ("Lane Keeping" in the table).

|  | $l_1$ | $\sigma_{f,1}$ | $l_2$ | $\sigma_{f,2}$ |
|---|---|---|---|---|
| Lane Change | 199.99 | 0.01 | 46.77 | 0.46 |
| Lane Keeping | 1881.5 | 0.30 | 97.81 | 0.34 |

Figure 6:
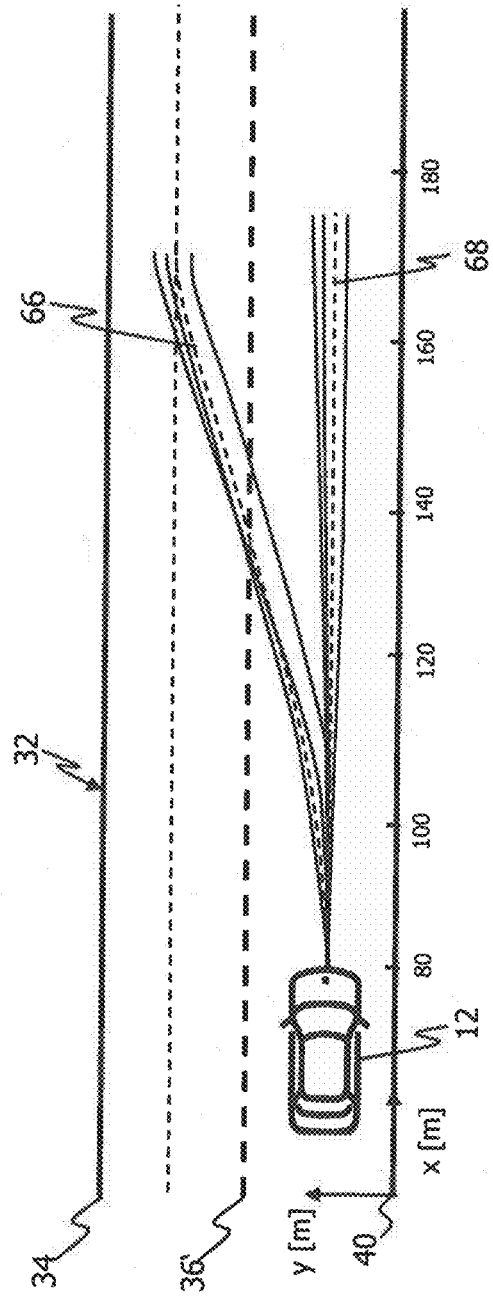
FIG. 6 shows a plurality of trajectories of various maneuver classes, generated by the control system, according to certain exemplary embodiments.

The paths $p^{(k)}=p_m^{(k)}+\xi_{ap}$ for a certain agent (in the present case, only the host motor vehicle 12 by way of example), generated by the control system 10 of the host motor vehicle 12 by adding the random samples of the Gaussian process, are illustrated in FIG. 6. In the figure, the host motor vehicle 12 (by way of example here) is in the right lane of the two-lane roadway 32. The statements analogously apply for determining the trajectories for the other motor vehicles 28, 30, 60. Three examples of paths are depicted in FIG. 6 for each of the driving maneuvers lane change and lane keeping. These involve the paths that lead away from the host motor vehicle 12 and are connected by a solid line. Each of these paths is subsequently simulated by the control system 10 of the host motor vehicle 12 within the scope of a run (rollout or playout) of a Monte Carlo simulation. The dashed-line paths 66 and 68 represent reference trajectories that the agent would follow in an ideal situation, i.e., when none of the mentioned uncertainties are modeled. Each of the reference trajectories ends in the center of the right lane for the generated path for the lane keeping, or in the center of the left lane for the generated path for the lane change.

In contrast, the deviations of the solid lines (paths) in FIG. 6 show the variability in the maneuver execution, considered within the scope of the present disclosure, which is taken into account by adding the samples generated by the Gaussian process and using the Monte Carlo simulation.

A deviation, resulting from the individual driving behavior of the particular agent (in particular its longitudinal axis), from the center of the right lane of the roadway 32 is thus taken into account by applying the Gaussian process in the case of a lane-keeping maneuver. This is apparent from the total of three paths, in addition to the reference trajectory 68, illustrated in FIG. 6, which in contrast to the reference trajectory 68 in each case do not end in the center of the lane. In reality, such deviations from the center of the lane are common in motor vehicles controlled by human drivers.

A similar situation results during the simulation of a lane change maneuver (likewise see FIG. 6), in which the reference trajectory 66 ends in the center of the left lane of the roadway 32. The trajectories depicted next to the reference trajectory 66 once again take the individual driving behavior of the agent into account, and simulate deviations from the center of the left lane of the roadway 32 when the end or target state is reached.

The lateral acceleration of the agent is determined from the generated path, using a suitable controller for path tracking (trajectory tracking), which for example is connected to or associated with the control system 10 of the host motor vehicle 12. This is achieved by controlling (by minimizing, for example) in each case the error in a point on the generated path that is (spatially and temporally) in front of the agent with regard to a reference path, for example one of the reference paths 66 or 68.

With reference to FIGS. 7a and 7b and 8a through 8d, two different driving situations of the host motor vehicle 12, each with different conditions, are described, which, where mentioned, differ from the interaction-based approach for the trajectory determination for the other motor vehicles 28, 30, described above in general, but which otherwise are based on the same considerations.

The driving situation illustrated in FIGS. 7a and 7b, similarly to the situation described with reference to FIG. 2, is a traffic situation in which the host motor vehicle 12 is traveling behind a second other motor vehicle 28 in the center lane of the roadway 32. The right lane ends at a short distance ahead, approximately 250 m to 300 m from the viewpoint of the host motor vehicle 12. Situated in the right lane is the third other motor vehicle 30, which intends to merge into the center lane of the roadway 32. In addition, situated in the passing lane, approximately next to the motor vehicle 28, is a fourth other motor vehicle 60 which is passing the host motor vehicle 12 and the second other motor vehicle 28. In the example shown in FIGS. 7a and 7b, it is known to the control system 10 of the host motor vehicle 12 that the right lane ends soon, even if the lane marking 70, which indicates the lane narrowing, is not directly detectable by the at least one surroundings sensor 14, 16, 18 because its visual range of the lane narrowing or the lane marking 70 of the roadway 32 is concealed by the other motor vehicles 28, 30. For example, the control system 10 of the host motor vehicle 12 may obtain this information, or at least derive it, from digital map data that is suitably provided to the control system 10.

In contrast, in the traffic situation illustrated in FIGS. 8a through 8d, it is not assumed that digital map data are available. In other words, no digital map data are provided to the control system 10 of the host motor vehicle 12, so that the roadway geometry and roadway topology must be determined by the control system 10, based on the surroundings data which are provided by the at least one surroundings sensor 14, 16, 18, and which are thus available only for the direct visual range in front of the host motor vehicle 12, and only for a few meters in front of the host motor vehicle 12. Thus, in particular the lane marking 70, which indicates the lane narrowing of the roadway 32, must also be determined by the control system 10, based on the provided surroundings data. Since in particular such lane narrowings (the same applies to lane widenings) have major impacts on lane change decisions, such roadway narrowings must be detected in a timely manner by the surroundings sensor system and incorporated by the control system 10 of the host motor vehicle 12 into the monitoring of the current traffic situation and into the determination of the possible movement paths of the other motor vehicles 28, 30, and 60.

As mentioned, due to the fact that the visual field, i.e., the detection range, of the at least one surroundings sensor 14, 16, 18 is somewhat limited by the presence of other road users in the current traffic situation, it is possible that a further road user traveling in front of a motor vehicle that is directly observable by the at least one surroundings sensor 14, 16, 18 may not be detected. This applies to the case in FIG. 8*a* for example, where it is shown that the third other motor vehicle 30 at that moment is traveling directly in front of the fourth other motor vehicle 60, and therefore is not detected by the surroundings sensor system of the host motor vehicle 12. If such a case occurs in a current traffic situation, it is possible that for at least a limited time, i.e., until the situation changes, interactions (regardless of which other motor vehicle or agent) with the motor vehicle 30 may not be taken into account in determining the possible trajectories for the other motor vehicles 28, 30, 60. Within the scope of the example presented with reference to FIGS. 8*a* through 8*d*, since vehicle communication among the motor vehicles in the current traffic situation also is not assumed, an approach for maneuver prediction that is independent of such vehicle communication is described below which at least provides precise short-term predictions.

Lane change maneuvers that cause another motor vehicle, traveling in front of the motor vehicle making the lane change, to brake heavily are difficult to predict using interaction-based approaches for monitoring the current traffic situation of the host motor vehicle 12, in particular when the motor vehicle to be monitored is situated directly in front of the host motor vehicle 12. This is the case, for example, with reference to FIG. 8*a* for the fourth other motor vehicle 60, which in the current driving situation is in front of the host motor vehicle 12 in the same lane of the roadway 32. As a result of the visual range of the at least one surroundings sensor 14, 16, 18 of the host motor vehicle 12 with regard to the third other motor vehicle 30 being concealed by the fourth other motor vehicle 60, it is not possible, based on surroundings data provided by the surroundings sensor 14, 16, 18, to make an interaction-based estimation of future trajectories for the third other motor vehicle 30.

To address this problem, within the scope of the example presented with reference to FIGS. 8*a* through 8*d*, an approach for maneuver classification is used which determines a probability-based distribution of the maneuver set $\mathcal{M}^{(k)}(t)$ for the particular agent k at time t. In this way, the advantages of a maneuver-based trajectory determination, i.e., the high accuracy of a short-term prediction, are combined with the advantages of the interaction-based trajectory determination for the particular agents that are present in the current traffic situation. Within the scope of the present disclosure, a suitable classifier, for example as part of the control system 10, is used for this purpose in order to generate class-based probabilities for potential subsequent driving maneuvers for each agent in the current traffic situation.

A maneuver simulation then takes place using suitable maneuver techniques, for example using Monte Carlo simulation for each agent. For this purpose, for each simulation run an initial maneuver is selected from the predicted driving maneuver probability distribution $P(\mathcal{M}^{(k)}(t))$, and a path for the particular maneuver is then generated or planned, using mathematical methods for trajectory generation described with reference to FIG. 5.

However, in addition to this initial maneuver, the current vehicle state of the particular agents is also subject to certain uncertainties. To take this into account, it is optionally possible to determine the particular initial state of an agent k from a (vehicle) state distribution and take it into consideration in a simulation step (also referred to as a simulation run or simulation cycle) of the Monte Carlo simulation.

Figure 9:
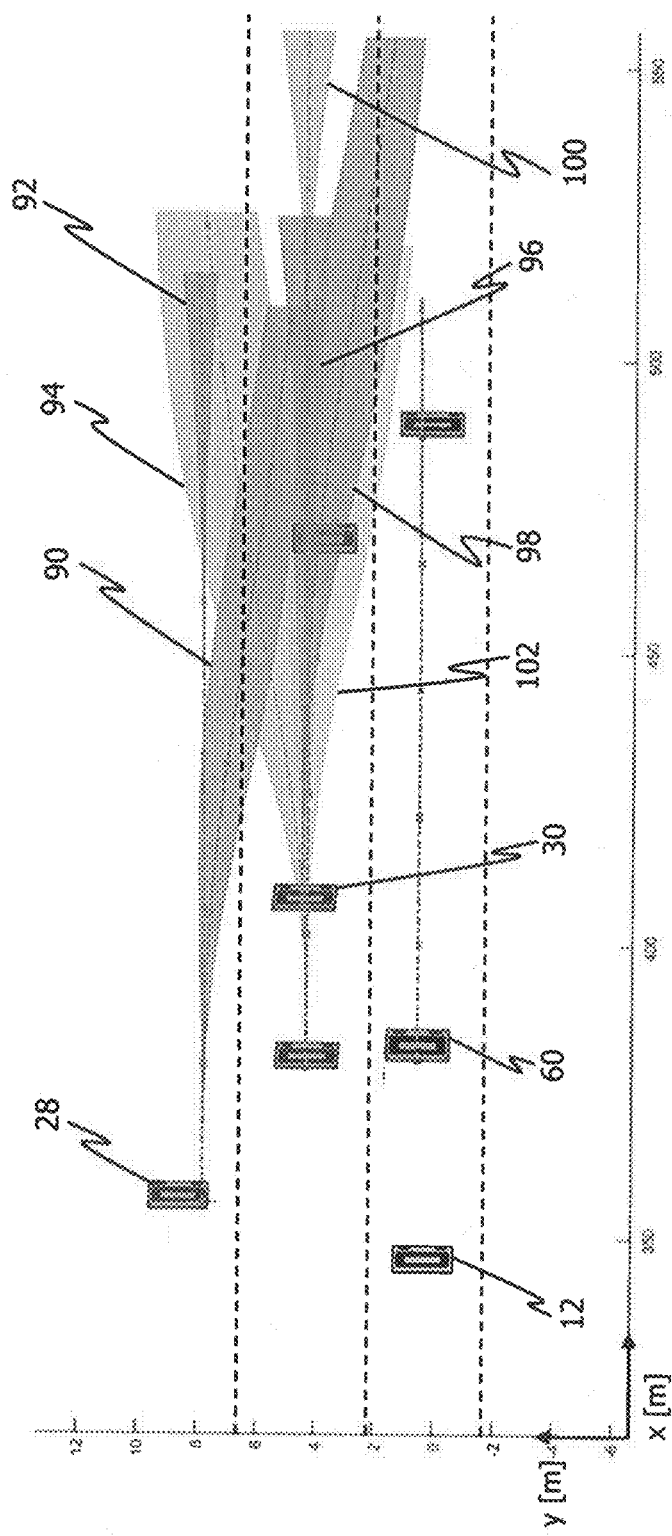
FIG. 9 shows future trajectory groups for other motor vehicles, determined by the control system of the host motor vehicle in a current driving situation, according to certain exemplary embodiments.

According to the example presented here, in each simulation cycle of the Monte Carlo simulation the control system 10 of the host motor vehicle 12 generates a future possible trajectory for each agent in the surroundings of the host motor vehicle 12 in the current driving situation. Using these individual trajectories in subsequent phases, for example during decision-making for a driving maneuver to be carried out for the host motor vehicle 12 and/or during trajectory planning for the host motor vehicle 12 in response to the current driving situation, would mean considerable computational effort. For this reason, the paths (trajectories) generated by the Monte Carlo simulation for a particular agent are grouped by the control system 10 of the host motor vehicle 12. This grouping (clustering) of the generated trajectories is carried out based on the end points of the particular trajectories at time $t=t+t_p$, using suitable computation methods such as the DBSCAN algorithm. Some of the trajectory groups determined by the control system 10 of the host motor vehicle 12 in the current driving situation for the other motor vehicles 28 and 30 are illustrated in FIG. 9. These are, for example, the trajectory groups 90 and 92 determined for the second other motor vehicle 28 in the driving situation shown in FIG. 9, and the trajectory groups 94, 96, 98, 100, and 102 determined for the third other motor vehicle 30. The interaction of the individual agents (i.e., the motor vehicles 28, 30 with one another) and the interaction of these agents with the host motor vehicle 12 and the further other motor vehicles illustrated in FIG. 9 are also taken into account in each case for determining these trajectory groups.

Each of the trajectory groups 90 through 102 shown in FIG. 9 is characterized by a sequence of Gaussian distributions for each vehicle state of the particular agents and an associated probability distribution of the trajectory group, the latter being defined as $p_c=n_c/n_m$, and $n_c$ being defined as the number of individual trajectories contained in a certain trajectory group (as the result of a simulation run of the Monte Carlo simulation). The number of steps and/or cycles that take place within the scope of carrying out the Monte Carlo simulation is characterized by $n_m$.

Computations that take place based on software are carried out in C code in order to meet the real-time requirements of the approach presented here for monitoring the current traffic situation of the host motor vehicle 12. Tests have shown that the computations without the parallelization of computation processes may be carried out on a conventional computer having a working memory of 16 GB and a clock time of 10 Hz. However, this is understood strictly by way of example, and is not limited to the example described with reference to FIG. 9 or to the remainder of the present disclosure. Optionally, even more rapid and efficient computation of the trajectory groups may be achieved by parallelization of the computation processes, for example by parallelization of individual Monte Carlo simulation steps or cycles and/or by parallelization of the data collection via the other agents in the current driving situation of the motor vehicle 12.

Once again with reference to FIGS. 7a and 7b and 8a through 8d, each of the illustrated traffic scenarios is now described in greater detail. In the driving situation illustrated in FIGS. 7a and 7b, object information concerning, for example, road signs (see the road sign 42 in FIG. 2, for example) and/or the roadway geometry is available to the control system 10 of the host motor vehicle from digital map data, while the computations of the control system 10 of the host motor vehicle 12 in FIGS. 8a through 8d are carried out based solely on the surroundings data of the at least one surroundings sensor. These surroundings data, as described above based on the particular driving situation, are incomplete at least in part. The comparison of these two scenarios illustrates the advantages of the presented approach to monitoring the current traffic situation by the host motor vehicle 12, even with surroundings information that is incomplete in part.

In the traffic situation shown in FIGS. 7a and 7b, a three-lane expressway 32 narrows to a two-lane expressway 32 in the travel direction of the host motor vehicle 12, approximately 250 m in front of same. As a result, the third other motor vehicle 30 must make a lane change to the left, since otherwise it would have to brake to a standstill due to the imminent ending of the right lane. The host motor vehicle 12 is in the center lane of the expressway 32, and at that location travels, for example, at a constant distance behind the other motor vehicle 28, for example based on following travel for which the speed is controlled by the control system 10 or some other electronic control unit of the host motor vehicle 12. The fourth other motor vehicle 60 at the moment is situated in the passing lane of the expressway 32.

The merging maneuver, i.e., the pending lane change to the left by the third other motor vehicle 30, directly influences the trajectories for the motor vehicles 28 and 60 that are then still possible. The lines 72, 74 (these two lines are superimposed, but for better clarity are shown slightly offset in FIG. 7a), 76, 78, and 80 (FIG. 7a) as well as the lines 72', 76', 78', 79', and 80' denote medians and/or mean values that are predicted for the particular agents. These medians and/or mean values may be determined by the control system 10 of the host motor vehicle 12, based on the trajectory groups for each agent. The dashes drawn on the lines (oriented in the y direction in FIGS. 7a and 7b) or ellipses/ellipsoids denote a 95% ellipse. In other words, an error or a deviation of a trajectory to be determined, which results at the particular measuring or update time, of 95% is acceptable, provided that the deviation in the x and y directions is within the particular ellipse. Thus, the ellipses indicate the deviations, resulting from the uncertainties in the maneuver execution, from an ideal trajectory for a trajectory to be determined.

The dashed lines in FIGS. 7a and 7b characterize a simulation scenario that is different from the solid lines in FIGS. 7a and 7b. In other words, FIGS. 7a and 7b each show two possible simulation results for certain trajectories for the motor vehicles 28, 30, and 60. Thinner lines (the lines 79, 78', and 79', for example), in comparison to thicker lines (the lines 72', 78, and 80', for example) denote a lower probability with regard to the particular maneuver class that is represented by the line in question (i.e., the simulated path). With reference to FIGS. 7a and 7b, this means, for example, that a probability of a lane keeping operation of the motor vehicle 28 at time t=0.9 s (see FIG. 7b) has decreased in comparison to time t=0 s. The probability of a lane keeping operation of the second other motor vehicle 30 approaches zero at both points in time, since the right lane of the expressway 32 is soon ending. Accordingly, the medians of the trajectories for a lane keeping operation are indicated by comparatively thin lines.

In the traffic situation shown in FIG. 7a at time t=0 s, the motor vehicle 28 has a speed of approximately 32 m/s, the motor vehicle 30 has a speed of 25 m/s, and the motor vehicle 60 has a speed of 34 m/s. In particular, these values are merely by way of example, and are not to be construed as limiting. Within the scope of the present disclosure, the three motor vehicles 28, 30, and 60 represent agents whose vehicle state is monitored by the host motor vehicle 12, and for which possible trajectories in each case are determined in the current traffic situation.

The end of the right lane, which is denoted by the lane marking 70 in FIGS. 7a and 7b, is known to the host motor vehicle 12. Therefore, the probability that the other motor vehicle 30 will not make a lane change is very low. This is indicated in FIG. 7a by a thin-line trajectory 79 for possible lane keeping by the motor vehicle 30. The control system 10 of the host motor vehicle 12 will thus assume at time t=0 s that the motor vehicle 30 is carrying out a lane change into the center lane of the expressway 32. The bold-line trajectory 80 in FIG. 7a indicates the high probability thereof (relative to the lane keeping).

Due to use of the interaction-based approach followed here for monitoring the current traffic situation by the control system 10 of the host motor vehicle 12, the pending lane change to the left by the motor vehicle 30 influences the possible trajectories for the second other motor vehicle 28. This results in two possible maneuvers at time t=0: a lane change to the left to follow the trajectory 76, or lane keeping combined with deceleration to follow the trajectory 78. The two latter maneuvers have approximately the same probability at time t=0 s. This is indicated by the trajectories 76 and 78, which are depicted with the same line thickness. If the motor vehicle 28 makes the lane change to the left and follows the trajectory 76, this in turn results in an interaction with the fourth other motor vehicle 60, which must then slow down to avoid a collision with the motor vehicle 28 after its lane change to the left. For the motor vehicle 60 itself, the two simulation scenarios each provide a trajectory 72 or 74 (shown close together in FIG. 7a) for a lane keeping operation having the same probabilities but different variances due to the individual driving behavior, which is indicated by the differently shaped ellipses/ellipsoids associated with the trajectory 72 (in dashed lines) and the trajectory 74 in each case. The reason is that a lane does not exist to the left of the motor vehicle 60, and the center lane of the roadway 32 is blocked by the motor vehicle 28.

FIG. 7b illustrates how the interactions between the agents present in the traffic situation are taken into account in order for the control system of the host motor vehicle 12 to make the most accurate predictions possible concerning the future development of the traffic situation. At time t=0.9 s, the motor vehicle 28 continues moving at a speed of approximately 32 m/s in the longitudinal direction in the center lane of the expressway 32, thus increasing the probability of a lane change to the left by the motor vehicle 28; the trajectory 78' is shown with a lesser intensity. This is due not least to the fact that the probability of a lane keeping operation at time t=0.9 s has decreased, since reliable and comfortable deceleration is no longer possible on account of the speed of the motor vehicle 28, which is still relatively high. The ellipses of the trajectory 78' are not shown in FIG. 7b for the sake of clarity. As a result of the increased probability of a lane change by the motor vehicle 28, indicated by the thickness of the trajectory 76', the motor vehicle 60, which is still traveling in the longitudinal direction in the passing lane of the expressway 32 at approximately 34 m/s, must decelerate to maintain a necessary safety distance from the motor vehicle 28, which is changing to the passing lane. This safety distance results from the longitudinal acceleration model described with reference to FIG. 2. For this reason, the varying parameters for a particular simulation cycle result in a comparatively higher possible longitudinal deviation in the prediction, which in FIGS. 7a and 7b is denoted by the error ellipses which are shown to be larger at time t=0.9 s than at time t=0 s.

With reference to FIGS. 8a through 8d, another example is now described in which the approach for monitoring the current traffic situation, presented within the scope of the present disclosure, uses only the surroundings data obtained by the at least one surroundings sensor 14, 16, 18 of the host motor vehicle 12. Accordingly, digital map data or the like are not known to the control system 10. Similarly as described with reference to FIGS. 7a and 7b, lines and/or ellipses that are indicated or depicted as comparatively thicker indicate a higher probability in the current situation, while comparatively thinner lines indicate a low probability. For the sake of clarity, only the right two lanes of the narrowing three-lane roadway 32 are illustrated in FIG. 8. Accordingly, in the traffic scenario illustrated in FIGS. 8a through 8d it is assumed that the surroundings sensor system of the host motor vehicle 12 does not detect the lane narrowing at time t=0 s, since the lane marking 70 that denotes the end of the right lane of the roadway 32 is concealed by the motor vehicles 60 and 30. In addition, for the surroundings sensor system of the host motor vehicle 12, the motor vehicle 30 is initially concealed by the motor vehicle 60 and therefore is not detectable. For the traffic scenario assumed here, the motor vehicle 28 is moving at a speed of approximately 30 m/s, the motor vehicle 30 is moving at a speed of approximately 20 m/s, and the motor vehicle 60 is moving at a speed of 25 m/s, in the longitudinal direction (x direction in FIGS. 8a through 8d).

When the speed of the motor vehicle 60 is to be maintained within the scope of the simulation of the future traffic situation, the motor vehicle 60 must make a lane change to the left in order to pass the motor vehicle 30, which is traveling at a slower speed than the motor vehicle 60. If the current speed of the motor vehicle 28 is also to be maintained, this vehicle as well must make a lane change to the left into the passing lane of the expressway 32, not depicted in FIG. 8a, since the center lane of the expressway 32 is also involved due to the possible imminent lane change by the motor vehicle 60 and the associated following of the trajectory 86.

In this case, the interaction of the motor vehicles 28 and 60 with the motor vehicle 30 at time t=0 s (see FIG. 8a) is not modeled, since the motor vehicle 30 is not detectable by the at least one surroundings sensor 14, 16, 18 of the host motor vehicle 32 [sic; 12]. For the same reason, at this point in time the control system 10 does not determine a possible trajectory or trajectory group for the motor vehicle 30. Thus, from the viewpoint of the host motor vehicle 12 there is also a relatively low probability of a lane change by the motor vehicle 60, since neither the right lane that is ending nor the motor vehicle 30 in front of the motor vehicle 60 is detected. This is indicated once again by the thin-line trajectory 86.

The approach described for maneuver classification is used here to compensate for this lack of status information. The control system 10 of the host motor vehicle 12 is thus able to generate class-based probabilities for potential subsequent driving maneuvers by using the classifier for each motor vehicle in the current traffic situation. The disadvantage of the incomplete surroundings information that can be delivered by the surroundings sensor system of the host motor vehicle 12 is at least minimized, at best compensated for, by incorporating the predicted driving maneuver probability distribution $P(\mathcal{M}^{(k)}(t))$.

In FIG. 8b, at time t=1.5 s the probability of a lane change maneuver by the motor vehicle 60 determined by the control system 10 is even higher, for example 25% to 35%, as indicated by the thicker-line trajectories 86' (compared to the trajectory 86). Nevertheless, there is a considerable probability of the motor vehicle 60 following the trajectory 88'. In turn, following the trajectory 86' results in an interaction with the motor vehicle 28 situated in the center lane, with respect to which probabilities, which are now similar if not identical, result for a lane change to the left (following the trajectory 82') and for a lane keeping operation (following the trajectory 84').

From the viewpoint of the control system 10 of the host motor vehicle 12, the highest maneuver probability for a lane change to the left by the motor vehicle 28 results at time t=2.0 s, which is illustrated for the traffic situation in FIG. 8c. This is associated with following the trajectory 86", while the trajectory 88" indicates the remaining, low probability of a lane keeping operation by the motor vehicle 60. The probability of a lane change by the motor vehicle 28 and the associated following of the trajectory 82" also subsequently increases greatly, and is at least greater than the probability of a lane keeping operation by the motor vehicle 28 and the associated following of the trajectory 84".

Lastly, the other motor vehicle 30 is detected by the at least one surroundings sensor 14, 16, 18 of the host motor vehicle 12 at time t=3.6 s, which is illustrated for the traffic situation in FIG. 8d, and the corresponding data are provided to the control system 10. The interaction between the motor vehicle 30 may thus be taken into account in determining the possible trajectories for the other motor vehicles 28 and 60 as well as for the host motor vehicle 12. Of course, the converse applies for determining possible trajectories for the motor vehicle 30, which is incorporated into the interaction-based approach for trajectory determination beginning at the time that these trajectories are detected. For the motor vehicle 30, this results in a relatively high probability of a lane change to the left and the associated following of the trajectory 88'" in comparison to following of the trajectory 90. This results, for example, from the relatively closer orientation of the motor vehicle 30 with respect to the lane marking 38' of the roadway 32 (see FIG. 8d) than to the center of the lane or even the right lane boundary line 40. Based on similar considerations, and also based on the orientation of the longitudinal axis of the motor vehicle 60 relative to the roadway 32, it is also possible, for example, for the relatively high probability of a lane change by the motor vehicle 60 at time t=2.0 s (FIG. 8c) to result.

When the motor vehicle 30 makes the lane change to the left as shown in FIG. 8d, this once again results in an interaction with the motor vehicle 60, which is already changing lanes at time t=3.6 s. For this motor vehicle 60, in both simulation scenarios there is a very high probability that the lane change will end in the lane delimited by the lane markings 36' and 38', as shown by the practically superposed dashed-line and solid-line trajectories for 86'''. The motor vehicle 60 must therefore slow down if a lane change by the motor vehicle 30 actually takes place, since otherwise the former could not maintain its current speed. The probability of an additional lane change to the passing lane of the expressway 32, not depicted in FIG. 8*d*, is very low due to the motor vehicle 28 approaching from behind, since the latter with a high probability will follow the trajectory 84''' and thus complete a lane change into the passing lane of the roadway 32.

Figure 10:
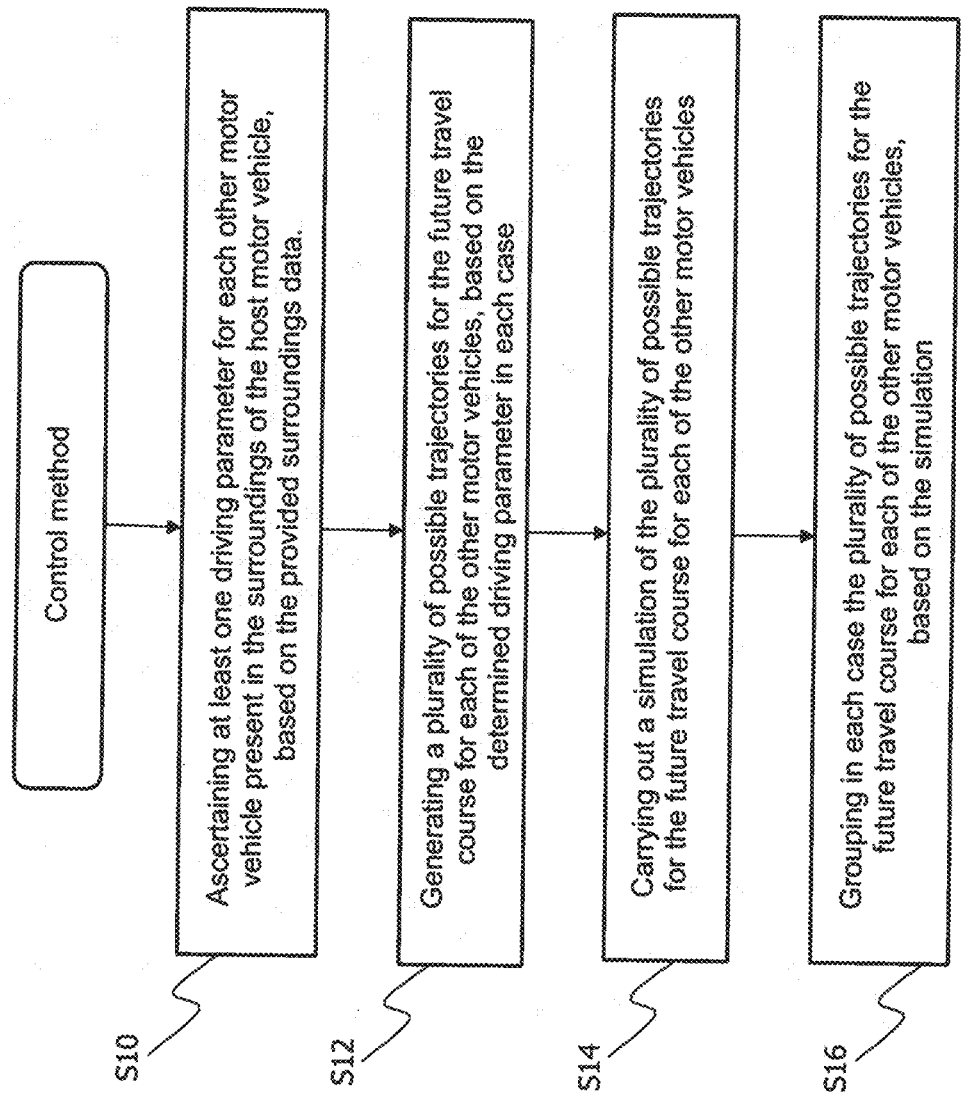
FIG. 10 shows a flow chart for a control method according to certain exemplary embodiments.

FIG. 10 shows a flow chart for a control method which recognizes lanes, lane boundary lines, lane markings, and/or other motor vehicles 28, 30, 60 in an area in front of, to the side of, and/or behind the host motor vehicle 12, based on surroundings data obtained from at least one surroundings sensor 14, 16, 18 situated on a host motor vehicle 12. The control method may be carried out, for example, by the above-described control system 10 of the host motor vehicle 12. All features described within the scope of the control system 10 may also be used for the control method.

At least one driving parameter is determined in a first step S10 for each other motor vehicle situated in the surroundings of the host motor vehicle 12, based on the provided surroundings data. For this purpose, a possible base driving maneuver (or the probability thereof), such as a lane change or a lane keeping operation, is initially determined for all other motor vehicles situated in the detection range of the at least one surroundings sensor 14, 16, 18. For the subsequent simulation, a reference path is then generated for each motor vehicle, based on the base driving maneuver determined in each case. In particular the above-described techniques for path generation may be used here.

One (or more) of the parameters described with regard to the longitudinal driver model and/or with regard to the lateral driver model is/are selected, in particular randomly, as the at least one parameter. If multiple parameters are selected for each motor vehicle, they may for example be aggregated in a vector. For example, all lateral parameters may be aggregated in a first vector, while all longitudinal parameters may be combined in a second vector.

A plurality of possible trajectories for the future travel course is generated for each of the other motor vehicles in a second step S12, based on the driving parameters that are determined in each case. In particular the above-described lateral and longitudinal driver models are used for this purpose.

A simulation of the plurality of possible trajectories for the future travel course is carried out in a third step S14 for each of the other motor vehicles. This takes place in particular using the motion model described above with reference to FIGS. 3 and 4.

Lastly, a respective grouping of the plurality of possible trajectories for the future travel course takes place in a fourth step S16 for each of the other motor vehicles, based on the simulation, in particular as described with reference to FIG. 9. Each of the plurality of grouped trajectories (trajectory groups) may have different relative probabilities. In other words, the trajectory groups of each of the motor vehicles may contain different trajectories, each of which indicates different probabilities that the motor vehicle in question will actually follow these trajectories in its future travel course. Thus, based on information concerning the travel status of all detected vehicles in the surroundings of the host motor vehicle 12, all of which are taken into account within the scope of an individual simulation of the current traffic situation, the current traffic situation and its future development are estimated.

Using the approach presented above for the interaction-based trajectory determination for all other motor vehicles present in a traffic situation in the surroundings of the host motor vehicle 12, carried out by the control system 10 as a control method, for example, a precise, efficient method for monitoring the current traffic situation of the host motor vehicle 12 is provided, and thus, subsequent decision-making and trajectory planning for the host motor vehicle 12 are improved with regard to driving comfort and driving safety for the occupants of the host motor vehicle 12, compared to conventional control systems.

Due to the utilized Monte Carlo simulation, using driver models (the longitudinal acceleration model and the lane change model) for the drivers of the motor vehicles in question in the particular driving situation, the interactions between the individual motor vehicles are modeled based on theoretical probability considerations. The results of the determination of the current traffic situation, including the determination of the trajectories for the motor vehicles in question, are further improved by combining or incorporating the maneuver classifier with/into the approach. As a result, as described in particular with reference to FIGS. 7*a* through 8*d*, an efficient, precise long-term approach is provided for monitoring the current traffic situation of the host motor vehicle 12 by its control system 10.

It is understood that the exemplary embodiments explained above are not exhaustive, and do not limit the subject matter disclosed herein. In particular, it is apparent to those skilled in the art that they may combine the features of the various embodiments with one another and/or omit various features of the embodiments without departing from the subject matter disclosed herein.

The invention claimed is:

1. A control system (10) which for use in a host motor vehicle (12) is configured and intended for recognizing lanes, lane boundary lines, lane markings, and/or other motor vehicles (28, 30, 60) in an area (22, 24, 26) in front of, to the side of, and/or behind the host motor vehicle (12), based on surroundings data that is obtained from at least one surroundings sensor (14, 16, 18) situated on the host motor vehicle (12), wherein the at least one surroundings sensor is configured for providing to an electronic control unit (20) of the control system (10) surroundings data that reflect the area in front of, to the side of, and/or behind the host motor vehicle (12), and wherein the control system (10) is at least configured and intended for determining at least one driving parameter for each other motor vehicle (28, 30, 60) present in the surroundings of the host motor vehicle (12), based on the provided surroundings data, generating a plurality of possible trajectories for the future travel course for each of the other motor vehicles (28, 30, 60), based on the driving parameter determined in each case, carrying out a simulation of the plurality of possible trajectories for the future travel course for each of the other motor vehicles (28, 30, 60); and grouping in each case the plurality of possible trajectories for the future travel course for each of the other motor vehicles (28, 30, 60), based on the simulation.

2. The control system (10) according to claim 1, which is further configured and intended for determining a base maneuver for each of the other motor vehicles (28, 30, 60) in the surroundings of the host motor vehicle (12), generating a reference path for each of the other motor vehicles (28, 30, 60), based on the base maneuver determined in each case, and determining the at least one driving parameter for each other motor vehicle (28, 30, 60) present in the surroundings of the host motor vehicle (12), based on the particular reference path of each of the other motor vehicles (28, 30, 60).

3. The control system (10) according to claim 1, which is further configured and intended for associating a property of a future possible driving maneuver with each of the other motor vehicles (28, 30, 60), based on the driving parameter determined in each case, and taking the property of the future possible driving maneuver into account in each case when generating the plurality of possible trajectories for the future travel course for each of the other motor vehicles (28, 30, 60).

4. The control system (10) according to claim 3, which is further configured and intended for determining the property of the future driving maneuver for each of the other motor vehicles (28, 30, 60), using a maneuver classifier as a probability class.

5. The control system (10) according to claim 1, wherein the at least one driving parameter in each case includes a current speed and/or a current acceleration of the other motor vehicles (28, 30, 60), and wherein the control system (10) is configured and intended for determining the driving parameter, based on an underlying probability distribution.

6. The control system (10) according to claim 1, which is further configured and intended for incorporating a random value in each case when generating the plurality of possible trajectories for the future travel course for each of the other motor vehicles (28, 30, 60).

7. The control system (10) according to claim 1, which is further configured and intended for carrying out the simulation in the form of a predetermined number of Monte Carlo simulations, and generating an individual trajectory of the plurality of trajectories for each of the other motor vehicles (12, 28, 30) within the scope of a Monte Carlo simulation.

8. The control system (10) according to claim 1, wherein the at least one surroundings sensor (14, 16, 18) includes a front camera, a rear camera, a side camera, a radar sensor, and/or a lidar sensor.

9. A control method, which in a host motor vehicle (12) recognizes lanes, lane boundary lines, lane markings, and/or other motor vehicles (28, 30, 60), based on surroundings data obtained from at least one surroundings sensor (14, 16, 18) situated on the host motor vehicle (12), wherein the control method is carried out in particular by means of a control system (10) according to claim 1, and wherein the control method includes at least the steps:

determining at least one driving parameter for each other motor vehicle (28, 30, 60) present in the surroundings of the host motor vehicle (12), based on the provided surroundings data, generating a plurality of possible trajectories for the future travel course for each of the other motor vehicles (28, 30, 60), based on the driving parameter determined in each case, carrying out a simulation of the plurality of possible trajectories for the future travel course for each of the other motor vehicles (28, 30, 60); and grouping in each case the plurality of possible trajectories for the future travel course for each of the other motor vehicles (28, 30, 60), based on the simulation.

10. A motor vehicle (12) that includes a control system according to claim 1.

* * * * *